(12) United States Patent
Graham

(10) Patent No.: US 7,761,591 B2
(45) Date of Patent: Jul. 20, 2010

(54) CENTRAL WORK-PRODUCT MANAGEMENT SYSTEM FOR COORDINATED COLLABORATION WITH REMOTE USERS

(75) Inventor: Jean Graham, Austin, TX (US)

(73) Assignee: Jean A. Graham, Austin, TX (US)

( * ) Notice: Subject to any disclaimer, the term of this patent is extended or adjusted under 35 U.S.C. 154(b) by 1202 days.

(21) Appl. No.: 11/303,388

(22) Filed: Dec. 16, 2005

(65) Prior Publication Data

US 2007/0143398 A1    Jun. 21, 2007

(51) Int. Cl.
*G06F 15/173* (2006.01)

(52) U.S. Cl. ............... 709/233; 709/204; 709/206; 709/217; 709/218; 709/219; 709/227; 709/250; 340/825

(58) Field of Classification Search ............... 709/204, 709/206, 217–219, 223, 227, 250; 340/825
See application file for complete search history.

(56) References Cited

U.S. PATENT DOCUMENTS

| | | | |
|---|---|---|---|
| 4,575,621 A | 3/1986 | Dreifus | 235/380 |
| 4,578,530 A | 3/1986 | Zeidler | 178/22 |
| 4,605,820 A | 8/1986 | Campbell, Jr. | 178/22 |
| 4,630,201 A | 12/1986 | White | 364/408 |
| 4,650,975 A | 3/1987 | Kitchener | 235/375 |
| 4,652,698 A | 3/1987 | Hale et al. | 380/24 |
| 4,656,474 A | 4/1987 | Mollier et al. | 380/23 |
| 4,709,137 A | 11/1987 | Yoshida | 235/379 |
| 4,720,859 A | 1/1988 | Aaro et al. | 380/23 |
| 4,727,244 A | 2/1988 | Nakano et al. | 235/380 |
| 4,746,788 A | 5/1988 | Kawana | 235/380 |
| 4,799,258 A | 1/1989 | Davies | 380/21 |
| 4,809,326 A | 2/1989 | Shigenaga | 380/23 |
| 4,827,508 A | 5/1989 | Shear | 380/4 |
| 4,837,422 A | 6/1989 | Dethloff et al. | 235/380 |
| 4,847,803 A | 7/1989 | Miyano | 364/900 |
| 4,862,501 A | 8/1989 | Kamitake et al. | 380/50 |
| 4,910,774 A | 3/1990 | Barakat | 380/23 |
| 4,926,480 A | 5/1990 | Chaum | 380/23 |
| 4,930,073 A | 5/1990 | Cina, Jr. | 380/25 |
| 4,961,142 A | 10/1990 | Elliott et al. | 364/408 |
| 4,962,531 A | 10/1990 | Sipman et al. | 380/24 |

(Continued)

OTHER PUBLICATIONS

Akst, Daniel, "Encryption Protects Virtual Cash for On-Line Shopping on Net," Los Angeles Times, Dec. 9, 1994, U.S.A., Section D, p. 10.

(Continued)

*Primary Examiner*—Rupal D Dharia
*Assistant Examiner*—James Baron

(57) ABSTRACT

Client-specified methods, systems and computer program product with multi-protocol access for data input requests designed around a client's business application. It does this by interfacing IVR/telephony programming of multiple communication device protocols to separate data source input protocol programming, including remoting programming. Data input is by selected IVR/telephony responses designed around the needs of the individual client through selection process within a variety of configuration templates. The templates are designed to interface with the business applications through programming procedures for data entry specific to each application's protocol. The advantage, templates reduce user/client's interface with the business applications resulting in minimal time and knowledge of each applications data requirements, and limits each user's access to the system to specific data input. System response for data output is limited to the requested input for error reduction.

16 Claims, 14 Drawing Sheets

U.S. PATENT DOCUMENTS

| | | | | |
|---|---|---|---|---|
| 4,965,568 | A | | 10/1990 | Atalla et al. ............... 340/825 |
| 4,969,188 | A | | 11/1990 | Schobi ........................ 380/23 |
| 4,974,193 | A | * | 11/1990 | Beutelspacher et al. ....... 726/20 |
| 4,984,270 | A | | 1/1991 | LaBounty .................... 380/24 |
| 5,025,373 | A | | 6/1991 | Keyser, Jr. et al. .......... 364/408 |
| 5,036,461 | A | | 7/1991 | Elliott et al. ................. 364/408 |
| 5,093,862 | A | | 3/1992 | Scwartz ....................... 380/25 |
| 5,103,079 | A | | 4/1992 | Barakai et al. .............. 235/380 |
| 5,109,152 | A | | 4/1992 | Takagi ........................ 235/380 |
| 5,111,504 | A | | 5/1992 | Esserman et al. ............ 380/21 |
| 5,120,939 | A | | 6/1992 | Claus et al. ................. 235/382 |
| 5,144,115 | A | | 9/1992 | Yoshida ...................... 235/379 |
| 5,146,499 | A | | 9/1992 | Geffrotin .................... 380/23 |
| 5,175,416 | A | | 12/1992 | Mansvelt et al. ............ 235/379 |
| 5,189,287 | A | | 2/1993 | Parienti ...................... 235/375 |
| 5,204,512 | A | | 4/1993 | Ieki et al. .................... 235/382 |
| 5,206,488 | A | | 4/1993 | Teicher ....................... 235/380 |
| 5,210,795 | A | | 5/1993 | Lipner et al. ................. 380/23 |
| 5,212,369 | A | * | 5/1993 | Karlisch et al. ............. 235/380 |
| 5,220,501 | A | | 6/1993 | Lawlor et al. ............... 364/408 |
| 5,221,838 | A | | 6/1993 | Gutman et al. .............. 235/379 |
| 5,223,699 | A | | 6/1993 | Flynn et al. ................. 235/380 |
| 5,224,166 | A | | 6/1993 | Hartman, Jr. ................. 380/50 |
| 5,225,664 | A | | 7/1993 | Iijima ......................... 235/380 |
| 5,227,612 | A | | 7/1993 | Roux .......................... 235/379 |
| 5,227,614 | A | | 7/1993 | Danielson et al. ........... 235/380 |
| 5,231,569 | A | | 7/1993 | Myatt et al. ................. 364/408 |
| 5,237,609 | A | | 8/1993 | Kimura ......................... 380/3 |
| 5,253,295 | A | | 10/1993 | Saada et al. .................... 380/23 |
| 5,265,164 | A | | 11/1993 | Matyas et al. ................. 380/30 |
| 5,267,314 | A | | 11/1993 | Stambler ..................... 380/24 |
| 5,276,312 | A | | 1/1994 | McCarthy ................... 235/380 |
| 5,288,978 | A | | 2/1994 | Iijima ......................... 235/380 |
| 5,317,636 | A | | 5/1994 | Vizcaino ..................... 380/23 |
| 5,327,497 | A | | 7/1994 | Mooney et al. .............. 380/25 |
| 5,335,276 | A | | 8/1994 | Thompson et al. ........... 380/21 |
| 5,343,524 | A | | 8/1994 | Mu et al. ....................... 380/4 |
| 5,365,225 | A | | 11/1994 | Bachhuber .................. 340/825 |
| 5,367,150 | A | | 11/1994 | Kitta et al. ................... 235/380 |
| 5,379,344 | A | | 1/1995 | Larsson et al. ............... 380/23 |
| 5,381,478 | A | | 1/1995 | Iijima .......................... 380/44 |
| 5,396,558 | A | | 3/1995 | Ishiguro et al. .............. 380/25 |
| 5,469,564 | A | | 11/1995 | Junya ........................... 380/4 |
| 5,513,261 | A | | 4/1996 | Maher ......................... 380/23 |
| 6,035,300 | A | * | 3/2000 | Cason et al. ....................... 1/1 |
| 6,069,627 | A | * | 5/2000 | Conrad et al. ............... 715/866 |
| 6,266,675 | B1 | * | 7/2001 | Evans et al. ....................... 1/1 |
| 6,314,415 | B1 | * | 11/2001 | Mukherjee .................. 706/47 |
| 6,335,964 | B1 | * | 1/2002 | Bowater et al. .......... 379/88.16 |
| 6,496,833 | B1 | * | 12/2002 | Goldberg et al. ................... 1/1 |
| 6,606,648 | B1 | * | 8/2003 | Mukundan et al. .......... 709/206 |
| 7,050,945 | B2 | * | 5/2006 | Oba et al. .................... 702/188 |
| 7,401,094 | B1 | * | 7/2008 | Kesler ............................... 1/1 |
| 2004/0193694 | A1 | * | 9/2004 | Salo et al. .................... 709/216 |
| 2004/0230328 | A1 | * | 11/2004 | Armstrong et al. ............ 700/83 |
| 2005/0097106 | A1 | * | 5/2005 | Lineman ...................... 707/10 |
| 2005/0198203 | A1 | * | 9/2005 | Tsai et al. .................... 709/218 |
| 2006/0218479 | A1 | * | 9/2006 | Torres ......................... 715/500 |
| 2007/0025529 | A1 | * | 2/2007 | Romeo .................... 379/88.14 |
| 2007/0038570 | A1 | * | 2/2007 | Halbritter et al. ............. 705/50 |
| 2007/0043611 | A1 | * | 2/2007 | Newman et al. .............. 705/14 |
| 2009/0031230 | A1 | * | 1/2009 | Kesler ........................ 715/764 |

OTHER PUBLICATIONS

Baig, Edward C., "The Information Society," Business Week/Information Revolution, 1994, U.S.A., pp. 162-132.

Chien, Philip, "Letter to a Beeper," Popular Mechanics, Apr. 1994, U.S.A., pp. 50-53.

Coy, Peter, "Invasion of the Data Shrinkers," Business Week, Feb. 18, 1994, U.S.A., pp. 115-116.

Hansell, Saul, "Banks Shutting Local Branches to Trim Costs," New York Times, Oct. 23, 1994, U.S.A., National Section, pp. 1, 18.

Harmon, Amy, "TCI, Microsoft Join Forces in On-Line Service Venture," Los Angeles Times, Dec. 22, 1994, U.S.A., pp. D1, D3.

Helm, Leslie & Amy Harmon, "AT&T Enters the On-Line Race," Los Angeles Times, Jan. 7, 1994, U.S.A., pp. D1, D12.

Hof, Robert D., "Welcome to the Next Level, Chipmakers," Business Week, Feb. 21, 1994, U.S.A., p. 74.

Holland, Kelley, "Everyone's Knocking on Home Banking's Door," Business Week, Mar. 28, 1994, U.S.A., p. 154.

Holland, Kelley, "Stalking the Credit-Card Scamsters," Business Week, Jan. 17, 1994, U.S.A., pp. 68-69.

Kupfer, Andrew, "Information Technology," Fortune, Aug. 22, 1994, U.S.A., pp. 111-118.

Laffredo, Susan, "Five Million Wireless Data Units in 1998," Electronic Business Buyer, Aug. 1994, p. 36.

Leutwyler, Kristin, "Superhack," Scientific American, Jul. 1994, U.S.A., pp. 14-17.

Levy, Steven, "Battle of the Clipper Chip," New York Times Magazine, Jun. 16, 1994, U.S.A., pp. 45-51, 60, 70.

Mannes, George, "Video Servers," Popular Mechanics, May 1994, U.S.A., pp. 160-121.

Newman, Joseph A. Jr., "Eight Banks and Thrifts in Three States Launch Video Banking Service," American Banker, Jun. 9, 1987, U.S.A., pp. 2, 25.

Nussbaum, Bruce, "The Best Product Designs of the Year," Business Week, Jun. 6, 1994, U.S.A., pp. 74-77.

Piol, Alessandro A., "Digital Information Services: Here Today and More Tomorrow," The Red Herring, Apr. 1994, U.S.A., pp. 46-49.

Prosise, Jeff, "How Secure is Encrypted Data?" PC Magazine, Oct. 25, 1994, U.S.A., pp. 291-293.

Radigan, Joseph, "Look Out Home Banking, Here Comes William the Conqueror," USBanker, Dec. 1994, U.S.A., pp. 22-26, 60.

Reinhardt, Andy, "Building the Data Highway," Byte, Mar. 1994, U.S.A., pp. 46-49, 52, 54, 56, 58, 60, 62, 63, 66, 68, 70, 72, 74.

Stallings, William, "SHA: The Secure Hash Algorithm," Dr. Dobb's Journal, Apr. 1994, pp. 32, 34.

Stix, Gary, "Welfare Plastics," Scientific American, Aug. 1994, U.S.A., pp. 84-86.

Tyson, David O., "MCI Communications Venture to be Delayed Until Next Year," American Banker, Jun. 28, 1984, U.S.A., pp. 2, 12.

Vizard, Frank, "The Magic Box," Popular Mechanics, Apr. 1994, U.S.A., pp. 39-41.

Weinstein, Michael, "Chase, Cox Plan Service for Other Banks," American Banker, Dec. 29, 1983, U.S.A., pp. 1, 14.

Wildstrom, Stephen H., ed., "The PDA Will Not Be DOA After All," Business Week, Jun. 13, 1994, U.S.A., p. 20.

"Buyer's Guide 1995: Business software," MicroTimes, Dec. 16, 1994 U.S.A., pp. 179-180.

"Systems Linking Automated Teller Machines, Point-of-Sale Devices Are Established or Contemplated in Several Areas of the Country," American Banker, Mar. 19, 1982, U.S.A., pp. 2, 16.

"The Smart Card Cashes In," The Economist, Jan. 29, 1994, pp. 73-74.

"What's New: Pager Plus," Popular Science, Apr. 1994, U.S.A., p. 18.

Flynn, Laurie, "Sharp Unveils a New Breed of Personal Digital Assistant," New York Times, Dec. 12, 1994, U.S.A.

Hotz, Robert Lee, "Computer Code's Security Worries Privacy Watchdogs", Los Angeles Times, Nov. 4, 1993, U.S.A., pp. A1, A20-A21 (pages missing).

Gunther, Robert, "Citicorp Skips Computer in New Home-Banking Plan," Wall Street Journal, Feb. 28, 1990, U.S.A.

Kristof, Kathy M., "It's Back, It's Improved: Banking by Computer," Los Angeles Times, Jan. 14, 1994, U.S.A.

Leopold, George, "Crypto Card Targets E-Mail," Electronic Engineering Times, Nov. 18, 1994, U.S.A.

Lewis, Peter H., "A Glimpse Into the Future as Seen by Chairman Gates", New York Times, U.S.A.

Miller, Jeff, "Should Phone Companies Make Films?" New York Times, Jan. 2, 1994, U.S.A.

Tyson, David O., "Low-Cost Computer Terminal Designed for Home Banking," American Banker, Apr. 4, 1984, U.S.A.

Tyson, David O., "'Survival' Kit: Pens and Stamps Instead of Video," American Banker, Mar. 14, 1989, U.S.A.

Gellene, Denise, "Digital Stirs into the Cellular Stew", Los Angeles Times, U.S.A., pp. D1, D4.

Helm, Leslie, "Hughes Ups the Ante in Satellite Network", Los Angeles Times, U.S.A., pp. D1, D12.

Helm, Leslie, "AT&T Pulls the Plug on Wireless Communicator", Los Angeles Times, U.S.A., pp. D1, D4.

Mace, Scott, "ViaCrypt to Market PGP Encryption for Windows".

Zimmer, Linda Fenner, "How Much is Too Much?".

"The Newest Personal Digital Assistants Let You Send Messages and Even Make Voice Calls Through Thin Air," Popular Science, Apr. 1994, U.S.A., pp. 67-69 (pages missing).

"Road to Cashlessness Paved With Plastic," Los Angeles Times, U.S.A.

"SecureWeb Kits Offer Security."

"Sign Here, by PC," Popular Science, Dec. 1994, U.S.A.

Special to the American Banker, American Banker, May 15, 1985, U.S.A.

"Visa and Intuit Team Up."

* cited by examiner

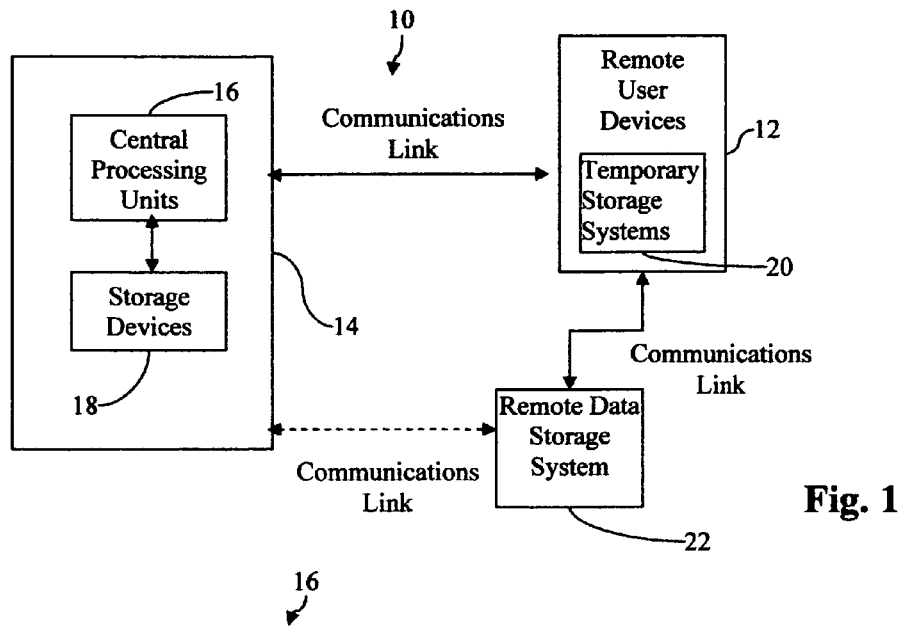
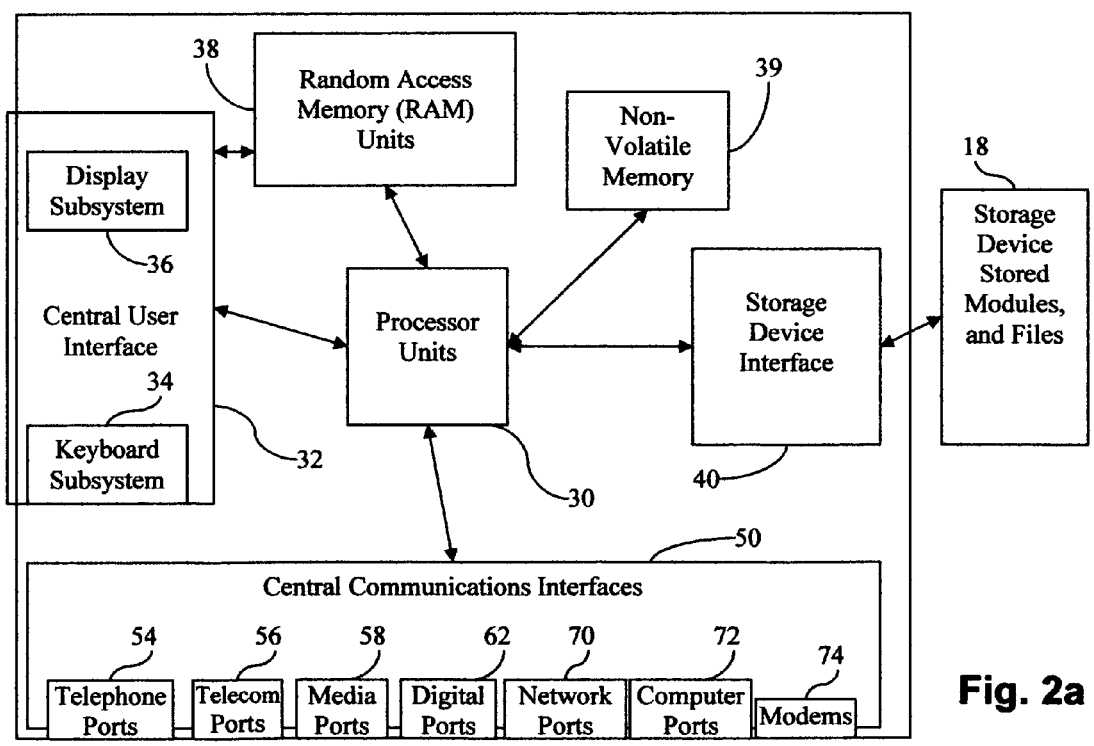
Fig. 1
Fig. 2a

CENTRAL WORK-PRODUCT MANAGEMENT SYSTEM FOR COORDINATED COLLABORATION WITH REMOTE USERS

FIELD OF THE INVENTION

This invention relates generally to informational communication systems, and data processing systems, and more particularly to a multi-component system which implements remote user access to licensee-owner specific central data and file management systems through a system of custom remote user applications which implements limited user access to data and file sources of the licensee-owner designated central applications and data management systems.

BACKGROUND OF THE INVENTION

For a number of years now, tremendous efforts have been devoted to devising systems for linking consumers, as well as users, with products and services applications which would allow the consumers and users to communicate with the centralized applications from remote locations, such as from their homes. Such efforts have produced some systems which have received a small degree of acceptance. Examples include internet shopping networks, home entertainment systems (such as Internet Gaming), remote stock transaction systems (such as Reuters), and portals such as those developed by Microsoft's SharePoint Service. While these remote internet systems have gained some acceptance, there still is for the most part an absence of a system for conducting company specific business methods, with specific business centralized applications, and with specific employees from a remote site, in a simplified manner accurately and with minimal knowledge in computer or in the area of expertise of the file and data management systems and associated data management applications required for work-product development.

The failure of the presently existing systems can be attributed to a number of different factors. One possible factor is cost, both in terms of the central application cost and the cost to the remote users. Another possible factor for the failure of the existing systems is the lack of an overall standard system which can be applied generally to a number of different applications. The existing linking systems are, for the most part, application-specific systems. That is, each central application is specifically designed to carry out a particular purpose. Typically, each application has a wide variety of proprietary methodologies from which the user must fully understand to implement. These large centralized application systems are usually effective for their intended purposes, however, they do have a significant practical drawback in that they tend to proliferate the use of a large number of different methods and systems. The problem with the proliferation of a myriad of application methods and systems is that they force users to learn and have the expertise, to choose between, and to use different methods and systems for each application need and possibly buy different equipment and devices for separate application requirement. This makes it very expensive for a user to be linked to any number of application specific software programs, and it also imposes a heavy time burden on the user. Many users, especially small business owners are unwilling to invest the money or the time needed to take advantage of the business computer applications, as well as, existing proprietary linking systems or global network portal systems. A more customized system patterned around business licensee-owner needs, usable in a variety of different business applications and on a variety of different communications devices connected to a variety of different application components employing a simple user interface, would be more readily accepted.

High cost and the lack of a generally applicable system are factors which have contributed to the failure of the existing linking systems and global computer network portal systems, but probably the most important factor is that of a heavy time burden imposes on the user. They force users to learn, to choose between, and to use different methods and systems for each application. Many people inherently distrust machines and, hence, are reluctant to conduct important matters by way of machines in the first place. This involves both verifying that the proper parties are conducting the transmission, and having the knowledge to ensure that information transferred is accurate and processed in the correct manner by the processing software applications and data management programs. Thus far, no generally applicable system which is cost effective and convenient to use performs this function satisfactorily. Hence, there exists a need for an improved system for linking remote users to centralized small business software applications accurately, efficiently and securely with a minimum of knowledge in the area of expertise of the applications to achieve the required results. Further objects and advantages of my invention will become apparent from a consideration of the drawings, ensuing description, and detailed description of the preferred embodiments.

SUMMARY OF THE INVENTION

In accordance with the present invention, here is a multi-component system for linking a remote user to an licensee-owner specific central data management system from remote locations to ensure that licensee-owner data management of data and data input from designated remote users is accurate, is consistent, is simple to access, and is implemented with a minimal knowledge of the licensee-owner specific file and data management application systems.

In the system of the present invention, the processing device, the storage device, a selection of remote devices and their associated device interface means are connected by means of custom user specific interface applications to form an overall remote user access system. Once formed, this remote user access system communicates with a specific remote user or a particular group of remote users allowing licensee-owner designated only access and data processing within specific segments of licensee-owner data stores and data management applications. In the preferred embodiment, the processing device provides the processing and communication capabilities, while the storage device provides the instructions necessary for communicating with a specific remote user and remote user device. Preferably, the processing device executes specific, licensee-owner designated, remote user instructions stored on the storage device to communicate with specific licensee-owner applications by specific remote users. In the system of the present invention, to communicate with central licensee-owner specific applications, all an application licensee-owner needs to do is to assign a specific remote user to a licensee-owner specific central security account and to a specific selection of user process ledger modules, herein referred to as UPLMs, previously configured for specific licensee-owner application work-product data access and data processing. This aspect of the present invention allows it to be generally applied to a number of different licensee-owner central applications involving a number of different central application licensee-owners and licensee-owner assigned remote users.

Once user recognition and user specific access is ensured by a central configuration means, a recognition methodology is preferably implemented between the central processing device and the central storage device remote user process ledger modules, and between the assigned remote user and the licensee-owner data management system. Consequently, only the proper remote user process ledger modules, UPLMs, and valid remote user devices may communicate with the licensee-owner data management applications and only in a specific licensee-owner designated manner.

Each user process ledger module, UPLM, is implemented for secure, limited access by it's designated users to it's connected licensee-owner data source by login and password recognition. Additionally, when concern for ensuring information security is of high importance, data stored on the storage device is, preferably, encrypted and information transferred between the user and remote device is also encrypted with the parameters used to effect the recognition and encryption methodologies regularly updated.

Overall, the system of the present invention provides a secure mechanism for linking different specific remote users to licensee-owner specific data management systems in a limited and well defined manner for different licensee-owner work-product projects and associated specific job tasks.

BRIEF DESCRIPTION OF THE DRAWINGS

FIG. 1 is a block diagram providing a broad overview of the system 10 of the present invention.

FIG. 2a is a detailed block diagram of the central processing units 16 of the present invention.

DETAILED SYSTEM DESCRIPTION AND THE PREFERRED EMBODIMENT

Figure 2B:
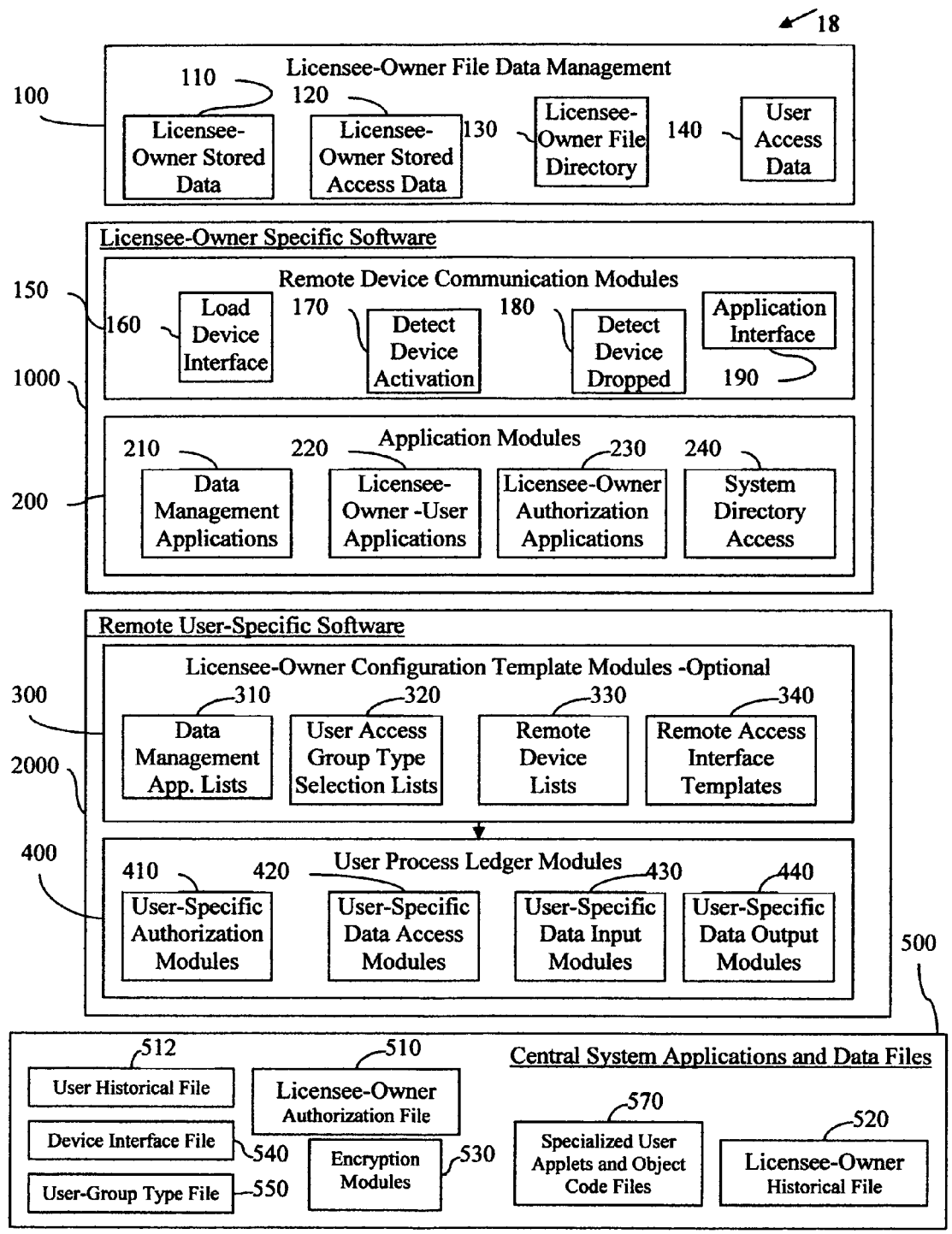
FIG. 2b is a detailed block diagram of the storage device 18 of the present invention illustrating some of the programs and the data files stored on the storage device 18.

A broad overview of the system 10 of the present invention is shown in FIG. 1, wherein the system 10 preferably comprises a central processing unit(s) 16, a storage device(s) 18, and remote user devices 12. Storage device 18 preferably connects to processing device 16 to form a central operating and management system 14 which communicates with the remote user devices 12 via one to several communications links. As a backup means a separate redundant system 22 is accessible through other communications links for the remote user offering continuous access capability should failure occur in system 14 or the associated communications links. Optimally, system 22 is a completely redundant system to system 14. However, it may function separately from system 14 offering different select capabilities such as licensee-owner review and central account management, as well as, data back-up functions.

As minimum system 14, a central processing unit 16 provides the processing capability, the remote communications units 12 provides communication with the central processing unit 16, through a set of user interface applications necessary for interfacing the central processing unit 16 with a remote user device 12. Either or both the central processing unit 16 and the remote user device 12 may each contain a minimum of software and user interface instructions. In the preferred embodiment, device 16 is a general purpose processing device capable of carrying out any desired function so long as the proper instructions are provided.

With reference to FIG. 2a, there is shown a detailed block diagram of the preferred embodiment of the processing system, herein referred to as Remote User Access System, RUAS 16 of the present invention, wherein the RUAS 16 preferably comprises one to a plurality of general purpose processors 30 (such as a microprocessor manufactured by Intel Corporation), storage device interfaces 40, communications interfaces 50, local user interfaces 32, optional non-volatile memory 39, and random access memory (RAM) 38. In the preferred embodiment, RUAS 16 is preferably a web server farm but can range from a multi-processor web farm network to a single processor desktop computer. Processor 30 carries out desired functions by executing program instructions stored on storage device 18.

A major function of RUAS 16 is to allow designated remote users to communicate with specific licensee-owner designated application component functions through a user interface, herein referred to a User Process Ledger Modules, UPLMs. Consequently, RUAS 16 preferably includes a central communications interface 50 and associated component functions that are implemented within UPLMs. Central Communications Interface 50 comprises one to a plurality of processing remote interface systems and associated communications ports FIG. 2a and FIG. 2c 54-74 coupled thereto, as well as, central computer system ports such as network ports 70 and other computer ports. This Central Communications System may include one to a plurality of; telephone port 54 for connecting to a universal telephone network, Telecom port 56 for connecting to a universal telephone network with a telephony interface, a media port and media processing interface, and a digital I/O port 62 for communicating by RF, optical, or cable means. Any form and number is acceptable so long as it is capable of communicating information in some form and can interface with a processing device 16. These various ports give the licensee-owner and remote users a good degree of flexibility in selecting the type of communications link to form in order to interact with a specific licensee-owner data management applications. It should be noted that processing system 16 can establish a unique relationship with more than one remote user device 12. This allows one to many processing devices 16 to be used with a plurality of different remote user devices 12.

RUAS 16 preferably further comprises a Central User Interface 32 including a display subsystem 36, and a keyboard subsystem 34, and memory for storing information including; a nonvolatile memory 39 for storing information permanently, and a RAM 38 for temporarily storing current program instructions and associated data. Instructions and data may be stored in the non-volatile memory 39 as needed including drivers needed to operate the components of the RUAS 16, such as the display and keyboard drivers, and the communications interface processing board drivers. System 14 preferably contains a storage device 18 shown in FIG. 2b. In system 10, storage device 18 may take on a number of different forms including magnetic media (e.g. hard and floppy disks, magnetic stripe cards, etc.), optical media (e.g. CD-ROM), user remote device storage system 20, and semiconductor memory (e.g. RAM, PROM, flash memory, etc.). Any form and number is acceptable so long as it is capable of storing instructions and data, and can interface with any number of processing device 16. Storage device 18 then provides the specific program instructions and data needed by the processing device 16 to operate and to interact with the remote user device 12. Storage device 18 includes four types of software and data storage therein: (1) a management program which controls interaction between the processing device 16 and the storage device 18, and performs security methodologies, historical logging, hardware driver implementation, FIG. 2b 500, herein referred to as a central operating system, (2) data management applications such as word processors, spreadsheets, database, and any separate or associated custom data management software applications, FIG. 2b 1000, (3) one to a plurality of central, licensee-owner application-specific programming modules, UPLMs, FIG. 2b 2000, which are licensee-owner designated central application component function selections which upon selection implements the licensee-owner specific data management function such as; data input, data output, data presentation, data processing and management in communicating with remote user device interface, and (4) licensee-owner specific data stores, FIG. 2b 100 which are accessed by either or both the data management software and above described UPLMs.

To maintain an open architecture, modules 530 in FIG. 2b preferably implement encryption algorithms which are industry accepted standards. However, if so desired, modules 530 may implement proprietary algorithms to limit RUAS 16 compatibility. The encryption/decryption functions can be achieved in various other ways. For example as shown in FIG. 2a, a hardware encryption component (not shown) may be coupled to and called upon by the processor 30 to carry out the encryption function. Also, an encryption processor may be incorporated into the processor 30 itself to perform the necessary encryption functions. Non-volatile memory 39 may further contain a section for storing encrypted recognition and comprehension parameters. These and other embodiments are within the contemplation of the present invention.

Figure 2C:
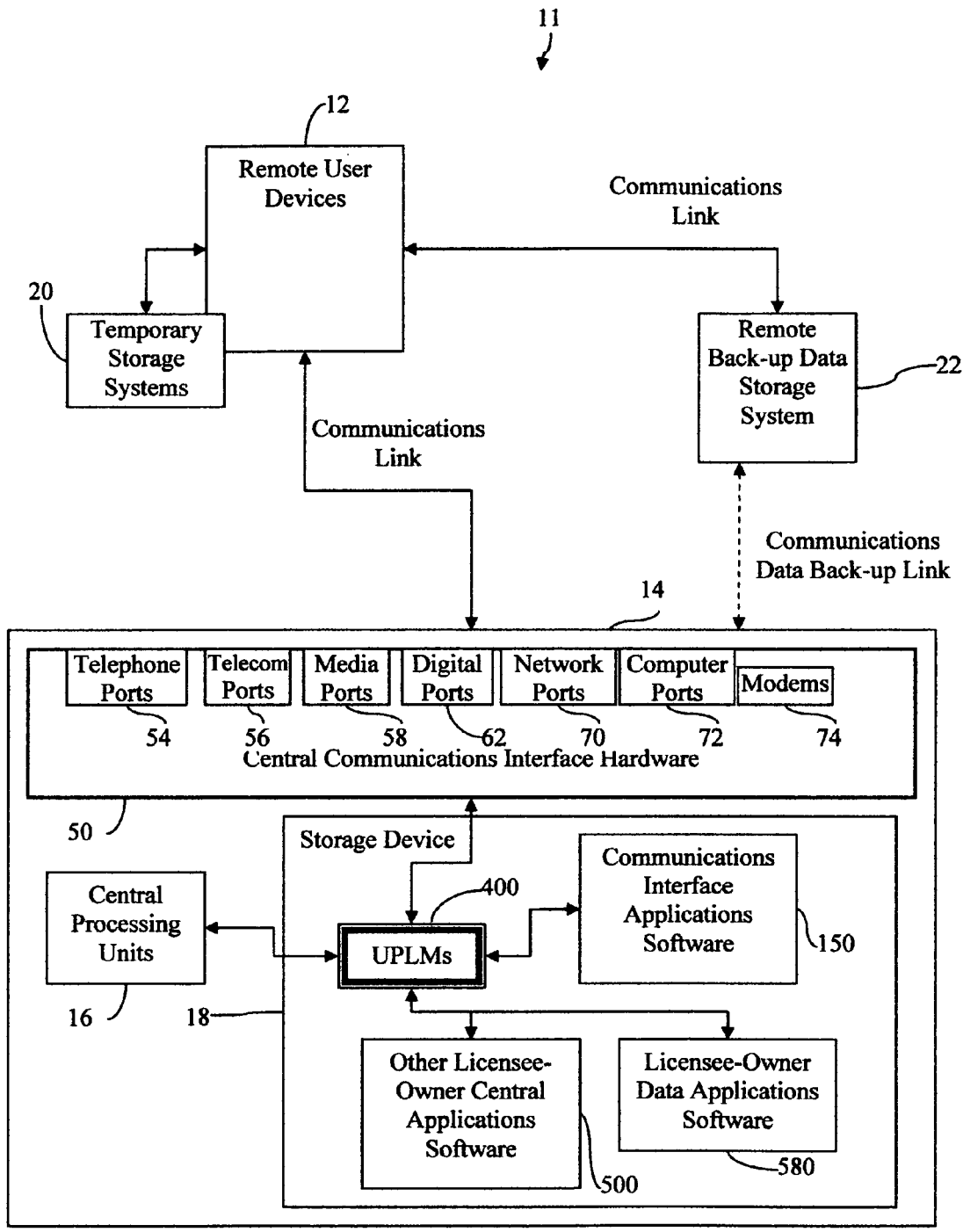
FIG. 2c is a detailed block diagram of the remote user device and back-up system 12 of the present invention illustrating the relationship of the UPLMs with some of the communications links, storage, hardware interface associated with communications system 12.

In reference to FIG. 2c, there is shown a detailed block diagram of the preferred embodiment of the Specific Applications Access System herein referred to as SAAS 11. SAAS II preferably comprises; a remote user device 12, a communications interface hardware means 50 and Central Communications Interface Applications Software 150 on storage device 18 for forming a communications link between the remote user device 12 and RUAS 16, a communications link, and optionally a storage device 20 for storing recognition parameter information and temporary data storage. In the preferred embodiment, storage device 20 may take on a number of different forms including a hard drive, an optical drive, a memory, cellular phone SIMs card, PCMCIA memory card, or some other device capable of storing information. Storage device 20 may be a part of the remote user device 12, as shown in FIG. 1, or it may be a separate and distinct component which is accessed by the remote user device 12 by a communications link, as shown in FIG. 2c 11. Both embodiments are contemplated in the present invention. In the preferred embodiment, SAAS 11 takes the form of any type of telephone device system, however, it should be noted that if so desired, SAAS 11 may take on various other forms such as a wireless portable device, or a computing device such as a, desktop, laptop, or handheld computer, or some other communications form. Any form and number is acceptable so long as it is capable of transmitting information in some form and can interface with a processing device 16 and central communications interface 50. Because of the various ports, the Central Communications Interface 50 allows SAAS 11 to communicate with the RUAS 16 through a variety of avenues and software means.

SAAS 11 may also comprise a different communications link to other remote storage systems. The remote user device 12 may communicate with a Remote Back-up Data Storage System 22 should access through the primary communicates link to system 14 fail. Remote Back-up Data Storage System 22 should contain some means of user recognition by the same or different UPLMs.

UPLM 400

Essentially, there are 3 main capabilities of any computer system; (1) data input, (2) data processing and storage, and (3) data output or display. In general, applications software have a protracted means for managing this data manipulation. This generally involves, first the licensee-owner learning, and remembering for later access and use, the entire software package in order to select which parts of the application package are required by their specific business practices and second, the users must learn the system well enough to apply only those specific application parts as required by the business owner and no others. For every computing system, generally there are three types of system storage; (1) the data stores, (2) the central system operating files, and (3) data management applications which if placed on a network my be employed by other remote users simultaneously. This typical system is well and good if business owners can afford an IT staff and are willing to pay for all employees using the systems to be trained. This invention, however, proposes an alternative. The UPLMs of this invention are individual modules that access both the data stores and the system applications each in a limited and circumscribed manner defined by the needs of both the licensee-owner's business requirements and the specific job requirements of the remote employee, client, or contractor herein referred to as remote user. References herein to user also refers to groups of users accessing the same UPLM at the same or different times who generally perform the same UPLM associated tasks for the same licensee-owner.

Figure 2D:
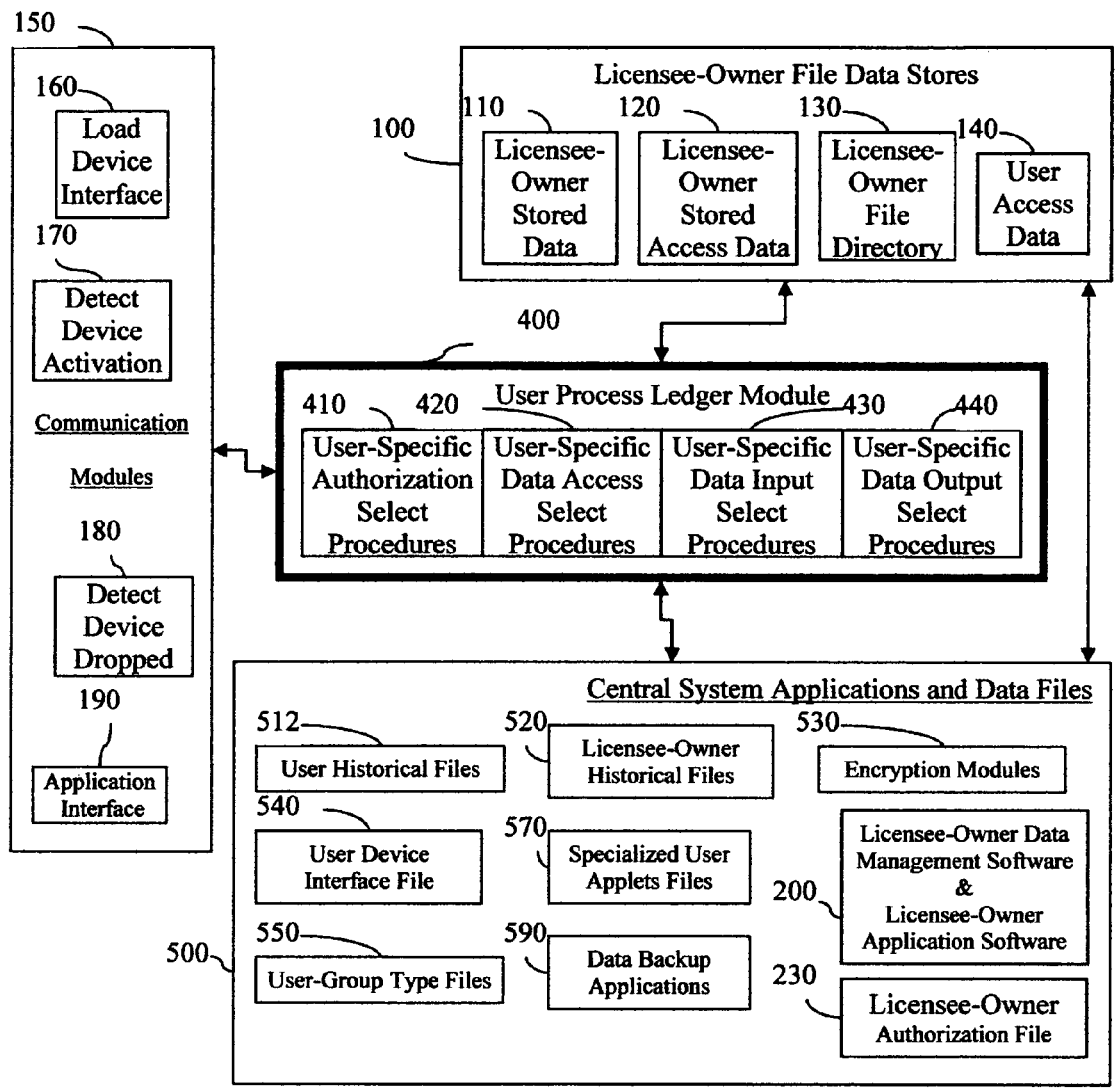
FIG. 2d is a detailed block diagram of the User Process Ledger Module interaction with files on storage device 18 of the present invention illustrating some of the programs and the data files associated with the User Process Ledger Modules.

The UPLMs 400 of storage device 18 of system 10 act as a gateway between the remote user device 12 via the device interface 50, and a licensee-owner specific data management application function. With reference to FIG. 2d, there is shown a detailed block diagram of the preferred embodiment of the UPLM 400 of the present invention. UPLMs relate to the direct needs of the licensee-owner work-product development and functions by implementation of a combination of component functions such as; the remote user selections, remote user data input, remote user login parameters, and by implementation of separate application component functions or central procedures for data and file management. Overall, UPLMs limit the remote user access, data input, data manipulation, data output and general user employment of the licensee-owner data and file accounts and account applications.

The basis of this invention is the consistent implementation of the repeatable application processes executed by the licensee-owner specific User Process Ledger Modules, herein referred to as UPLMs FIG. 2b 400. These licensee-owner custom applications, UPLMs, limit the access and interface of the remote user within the licensee-owner accounts and licensee-owner central applications. The UPLMs may implement the recognition and comprehension methodologies of the present invention to ensure that the remote user is authorized to interact with the licensee-owner central data management and data storage systems in the appropriate manner and with the appropriate information according the requirements of the licensee-owner's business or work-product production practices. These recognition and comprehension methodologies may include component functions such as; the allowed time of access of specific remote users, Global Positioning Satellite (GPS) remote user location data, daily or regular remote user password changes, central system recognition of remote device, and device connection protocol checking assisting in information input and proper processing by determining data input and access to file and data sources.

After secure access to the central system, remote user UPLMs instructions and their associated application component functions may cause the processing device 16 to perform any number of user specific functions as defined by the licensee-owner as shown in FIG. 2d such as: retrieve from data storage stores recognition parameters which are unique to the remote user, 140; generate session codes to send to the specific licensee-owner data management applications 200; process the parameters, the session codes, and the remote user selected data or file requests; or send the processed parameters, processed session codes or processed remote user selected data or file requests to one or the plurality of; data management applications 200; licensee-owner data stores 100, remote user requested output device communications modules 150. As such, the UPLMs are designed as an interface for the remote user selection of execution options in the licensee-owner data management process. UPLMs may also supplement the required processing parameters and associated functions related to the remote user selection during data processing instruction using specific user and project parameters. The UPLMs may contain and number of object codes or procedures and interface with any number of other UPLMs, as well as, licensee-owner data stores, and licensee-owner selected central application packages. In communicating with the remote user device 12, processing device 16 thus executes the selected UPLMs which by their selected code objects, the data management programs implemented from within storage device 18.

This system of UPLM defined use of central system applications and user data can be employed and managed locally on site to the business owners location. However, for better collaboration and IT support, locating the central system off-site and managing the system with a central administrator greatly reduces the cost of having IT support and is the preferred invention embodiment. Once the UPLMs are generated, thereafter, any supplementation, replacement, and program or software updates required by the central system applications, communications interface, and associated UPLM processing code can be completed, preferably, with minimal to no in the UPLM remote user interface. Since re-training, re-learning, supplementing, replacing, and updating the central licensee-owner applications and UPLMs is achieved only by the central system 14 operators, programmers and administrators, the remote user exposure to change in the UPLMs interface and the resulting user retraining costs can be kept to a minimum. Thus the cost to the licensee-owner of consistent, accurate, designated, specific communication with licensee-owner data management applications as a business or work product will be kept to a minimum. This aspect of the invention makes it much more practicable than most, if not all, of the prior art systems. The UPLM aspect of the invention is advantageous because it significantly reduces the cost in money and time-expenditure to both the remote user and the licensee-owner of implementing system 10. Additionally at the minimum, central application licensee-owner need only invest in rights and licenses to use the central system applications and any needed additional remote user access devices. System 10 also serves to ensure that remote users clearly understand and are properly accessing the data by limiting their access in the design of the UPLMs.

UPLM Configuration & Optional Template Use

Optionally, User Process Ledger Modules (UPLMs), may be generated by using base templates containing central data management and remote interface application component function selection lists referred to herein as code objects which upon selection interact to generate one to many licensee-owner specific UPLMs, FIG. 2b 300, however, these UPLMs can also be generated independently by a central programmer or central system administrator. This general configuration means of the UPLMs within the central system ultimately results in the UPLM generation and implementation. The means of UPLM generation, update, or general management can range from a custom UPLM application designed and updated by a programmer for a single remote user or remote user type group, to multiple UPLMs designed by a central application licensee-owner configuration template or licensee-owner specific template resulting in the generation or update of each individual UPLM. These configurations may generate UPLMs, as well where upon the use of special access rights by specific remote users to separate components within the each individual UPLM can be updated, revised or managed. This range of configuration means is within the contemplation of the present invention. These licensee-owner configuration templates, initially created by a central system programmer, preferably further includes a guide in decision making presenting one to a series of GUI screens of information and selection lists of licensee-owner application access and data or file management procedures to be implemented by licensee-owner's designated remote users. The template specification for the design, configuration, and generation of the licensee-owner specific UPLMs may be accompanied with application component function selections to display UPLM graphical pages, procedural prompts, billboards, graphic display file, voice recorded files, and any other processing or remote user interface required to achieve proper implementation of the resulting UPLM. In addition to the means of displaying information about UPLM setup and configuration options, these templates may also include selections of help files of information on licensee-owner application features, services, and service support options, as well as, other programs related to said central applications management system and associated remote user interface setup options for the UPLM to be generated.

Examples of UPLM Components and Generation

As an example of one of the selection means for generating a UPLM, licensee-owner configuration template setup options may include, for example, a remote user interface application for international localization. This international localization in the UPLM design may be achieved by changing UPLM access to central system international resource files as a mechanism for isolating, editing, and compiling the localizable elements of the UPLMs, and central licensee-owner application implementation, or any associated application from different language editions. Some examples of the elements of this design might include: a localization tool for tracking when the UPLM administrator adds, changes, or deletes localized UPLM elements; access selection of directories of native language voice files for UPLM implementation, associated native language dialog boxes for the UPLM implementation, message tables storing alert and error messages that may contain more than one replacement parameter within text of multiple languages and character sets, or the ability to compile multiple language resources in a single executable files or into separate (Dynamic Link Library) DLLs, and switch the language of the UPLMs at run time, declaring which languages a given executable UPLM, file, or DLL supports with the execution based on remote user access and recognition parameters.

Examples of a major function of the UPLMs is the limited and very specified licensee-owner database source access by designated UPLM remote users. Access to such database objects as; data files, database tables, data set, and data fields may be accomplished by running code for connection and data objects declaration, or by design to defined specific detailed information about what data can be retrieved from a database connection by either or both licensee-owner configuration templates or direct programming of the UPLM. Data returned by running this code, hereto referred to as data sets, may include alpha-numeric data and information, as well as, HTML pages, file and document location access, media network links or any other type of information available by computer access. UPLM components also may be used to execute data aggregate calculations or execute further data processing of the data set returned. For UPLM generation the licensee-owner configuration templates can be designed for component implementation specification selected from selection lists of remote user accessible database management objects such as: a data source connection object or multiple connection objects accessing multiple data sources and data source types within a single or multiple licensee-owner configuration template; or database source locations including selection lists based on database objects such as; table, view by stored procedures or selection lists based on a Structured Query Language (SQL) queries or other programmed queries including programmed queries generating dynamic interactive UPLMs remote user interface data access by runtime query building; or licensee-owner configuration templates members capable of creating command objects which define specific detailed information about what data is retrieved from a database connection. These command objects can be based on database objects such as a table, view, stored procedure or a Structured Query Language query or any other data access procedure. These command objects also having the ability to create relationships between sets of command objects to retrieve a set of related data in the form of a hierarchy. Additionally, these licensee-owner configuration template database setup options may be built with a grouping hierarchy by using dynamic relational database hierarchical data set returning objects related to licensee-owner account tables, fields, and any other licensee-owner account database objects. Thus, at licensee-owner configuration template execution time, the configuration process can contain information about relationships between a data set or database objects for selection in retrieving a set of related data in the form of a group of data returning objects that define an hierarchical a data set. This above example is a means of several possible means of allowing for flexible UPLM generation as licensee-owner data and work-product projects structure changes and matures without having to redesign the licensee-owner UPLM generation system itself.

Another example of a database source selection means for generating a UPLM, optional licensee-owner configuration template setup options may include, for example licensee-owner configuration templates designed to create a single to multilevel master/detail form based on the parent/child user selected database or data set objects, building a grouping hierarchy or relation hierarchy data set returning objects, hereafter referred to as hierarchical data. Thus licensee-owner configuration templates are designed for user selection of data retrieval of single or multiple data set objects. Either or both the UPLMs and licensee-owner configuration templates, hereto referred to as the interface to data managing applications, may further include hierarchical data bound reports creating a parent/child form based on records returned by parent object and related records returned by child object, configured to simultaneously access; a record with a group of related records, a record from one table or query with a group of related records in a second table or query, or any other combination of related records. Thus remote user select references within the UPLM can be established from the database, table, query, field, data source and presented as a hierarchy to the remote user or licensee-owner for selection of; runtime or licensee-owner set up design time report design. As well, the interface to data managing applications objects may bind hierarchical data to a set of controls on a form, for further processing.

Another example of a data source selection means for generating a UPLM, optional licensee-owner configuration template setup options may include, for example objects that are used to bind the data returned or the above hierarchical data to a set of controls on a form, selection of which may create a data grid, hierarchical flex grid, or data bound control as part of processing the data return results within the UPLM remote user interface. Data binding may also occur from data server applications and components, and to single or multiple web server and browser interfaces thus employ database access and data information gathering by accessing remote network distributed information applications, and other select non-central located objects and components not necessarily directly referenced by the licensee-owner configuration template members or UPLM components.

Another example of a data source selection means for generating a UPLM, optional licensee-owner configuration template setup options may include, for example where GUI configuration forms configure a collection of file templates for exporting reports in a variety of formats, each tailored to the report type exporting the data report manually or automatically for a global, local, or single document distribution. These file templates may include; HTML, mail, and text documents, image document formats such as .pdf, FAX, or any other data type report output. The licensee-owner configuration template can be an interactive, runtime, data bound report designer for creating multiple section data reports with remote runtime data access to data sources, setting data properties that bind the report controls to fields in a data set, including data source and data member properties. These template designs may be chosen from a variety of layouts containing objects, such as; report title, author, or database name, page header, detail headers for report's repeating section, image objects for report graphics, and other formatting detail. Thus the interface to data managing applications can be designed for licensee-owner selection of; output forms, output transmission device, and any associated transmission requests selection required for data reporting transmission, including designs for the UPLMs to retrieve and report data to and from remote locations through a variety of remote devices and devices interface with limited data transmission capability.

Another example of a data source selection means for generating a UPLM, optional licensee-owner configuration template setup options may include, for example the ability of the UPLM to perform data passing from application to application and object to object by a object method, property, function, procedure, or sub routines with or without parameters or variables.

Another very basic example of a data source selection means for generating a UPLM, optional licensee-owner configuration template setup options may include, for example licensee-owner account database field selections as a single selection or a set of hierarchical, gradational selections with each additional field selected, the combination of which, further narrows the possible data categories or file locations available to the remote user's specific requested need. This selection of database fields for location specific files or other categorization of data may be applied to a specific base UPLM for a single related specific operation or related data set of operations or file selections.

Generally, the UPLMs of the present invention comprises six categories of component systems; 1) remote user permissions and access allowing for access to all or specific UPLM components, 2) selections of possible work-product action or operational needs of the remote user presented as a single list or separate hierarchical, gradational related data or file requests, 3) means of relating the remote user selected request to a data or file sources, 4) a source of data or files related to the results of the remote user selected requests, 5) the ability to interface and transmit with a remote user through a communications device the related data, file, or files, as single files or as connected continuous set of related data or file merge presentations, 6) the ability to process the data or files including data or file binding, data or file passing, or any other data or file processing needs to produce the licensee-owner work product. The interface to data managing applications by of selections of items in the six categories may then couple or connect the related data management components generating a base or updated UPLM for implementation of the specific selection of components.

UPLMs, may also have the ability to change the UPLMs responses to remote user requests by changing and adding to the six base UPLM components thus changing later implementations of this UPLM or making another UPLM within the remote user selection process. Common to all embodiments of this invention and in addition to directly interfacing with the central system at the central system location, is the optional ability to interface by a communications device, such as a computer network, to a central system of applications for the purpose of updating and generally managing the UPLMs. Full or limited access to the central system may be assigned to specific remote users by the licensee-owners. As well, full or limited component access may be assigned to designated trained or experienced remote users for each individual UPLM to update and generally manage the UPLM components.

An example of the management of individual UPLM components within this invention may be to only exposed to experienced remote users by access permission recognition specific management components on the UPLM while other remote users accessing the UPLM would not be exposed to these management components. These specific management components on the UPLM may include for example, hierarchical category addition options and related data or files being generated and updated within the UPLM of previously undisclosed data, files, or file information such as new document central storage or the generation of new central voice files. These updates may include creating new operation categories within the base UPLM categories, addition of data and files within this new category or within an existing category or directory, or any other UPLM structure change necessary to more fully access the appropriate data and file information. Through UPLM processing, or by a separate central application processing, the UPLM then recognizes these new data or file user category requests and associated informational data and files and offers them to the next remote user as additional possible request options the next time the UPLM is accessed. Thus, UPLM data, files, and option changes are easily and directly changed with almost no recognizable change in the remote user interface.

UPLM Configuration Conclusion

In general, optional licensee-owner configurations template members include the ability to; add or delete standard licensee-owner application property, method, procedures and events; add or delete object defined attributes for licensee-owner application public property, method, procedures and events for a selected licensee-owner application interface including selected licensee-owner database applications; add or delete any other specific licensee-owner application and application component required by licensee-owner for work product production.

The above examples are given as possible means employed within the UPLM design and configuration means such that the licensee-owner may manage and control remote user access and implementation of licensee-owner central accounts and managing applications. All the above examples results may be employed by a programming means only without the use of licensee-owner configuration templates. The UPLM generation examples are given to more fully describe the type and aspects of the UPLM generation and implementation and are not meant in any way to define or limit the implementation avenues of the UPLMs within this invention.

Depending on the remote user selections and data input types configured in the UPLM interface, the UPLM executes the procedures and components in one to many disparate licensee-owner application component functions to data manage the remote user input and report the results. Overall in the UPLM design, there is great flexibility in selecting the parameters used in the file and data management processing and in their use by the data managing applications as well as a great deal of access specificity.

FIG. 3: Licensee-Owner Principal System Operation

The Central System User Device Interface File 540 on storage device 18, is the initial program which loads and is executed by processor 30 to coordinate remote user and licensee-owner interaction with system 10. Once the processor detects a connection from a device interface monitor module, this or an associated program module recognizes the remote user as a new remote user or as a licensee-owner, as shown on the flow diagram 510 is the beginning to the process of the licensee-owner authorization and recognition. If the remote user is recognized as a new licensee-owner, the new licensee-owner passes through an initialization system confirming their identities and assigning passwords, FIG. 3a, 510.2-510.6. At this point, the new licensee-owner selects from the central system software applications available for licensure, requests the installation of their proprietary software, or any desired application as long as the proper licenses and secure installation on the central system can be provided, FIG. 3a, step 510.8. Next, a merchant account, 510.10, or any other form of payment is agreed to and the password and security initialization process is initiated, step 510.14 wherein the new licensee-owner is recognized within an established new licensee-owner account. If the remote user is recognized as a now existing licensee-owner by the system, connection execution, steps 510.2-510.34 or 510.29 in FIG. 3a, verifies the licensee-owner and accesses their account to complete the verification and gathers the licensee-owner processing parameters, FIG. 3b 1002.

Figure 3A:
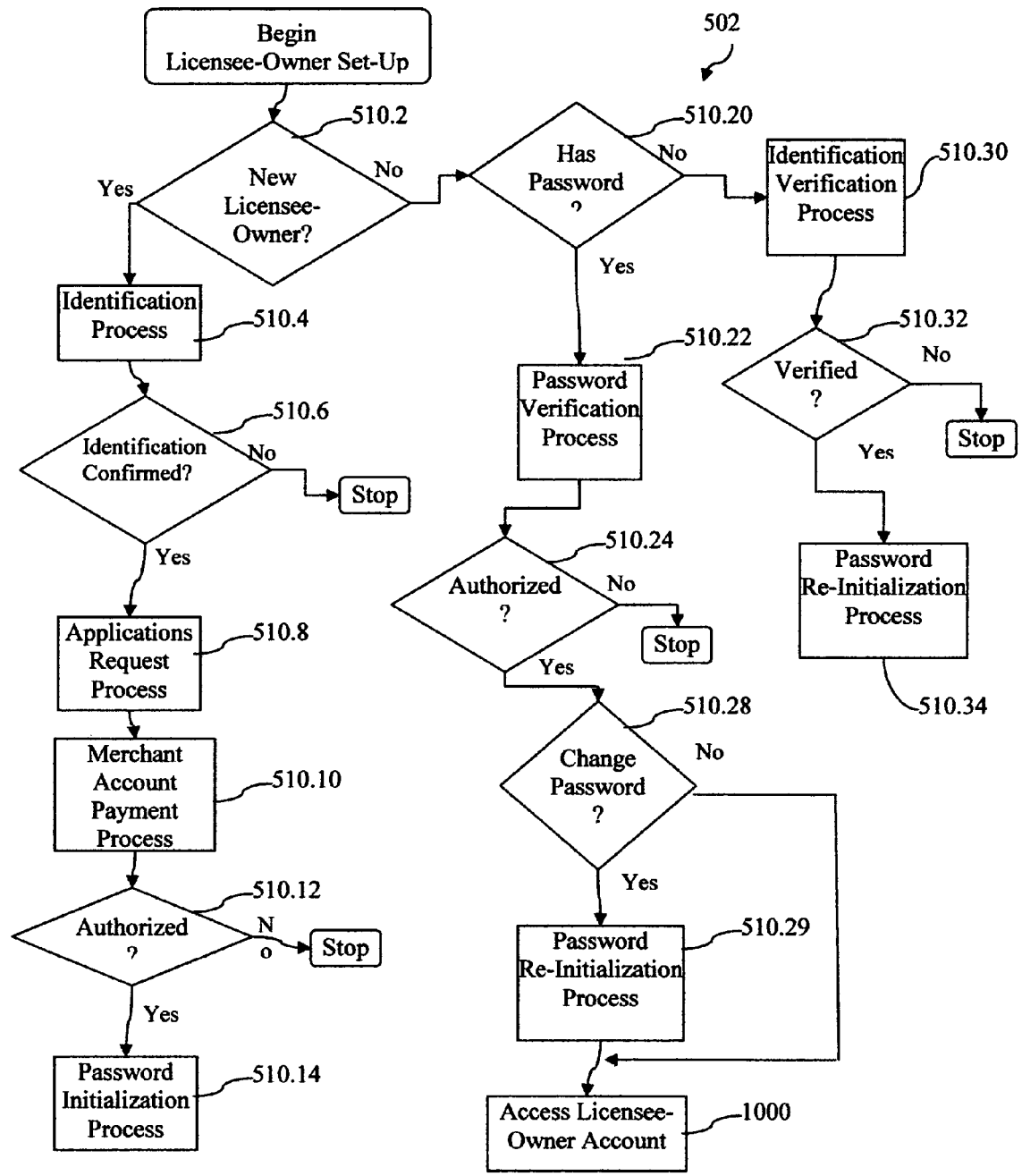
FIG. 3a is a detailed flow diagram of the initialization step in the licensee-owner connection and access application authorization file of 510 of FIG. 2b.
Figure 3B:
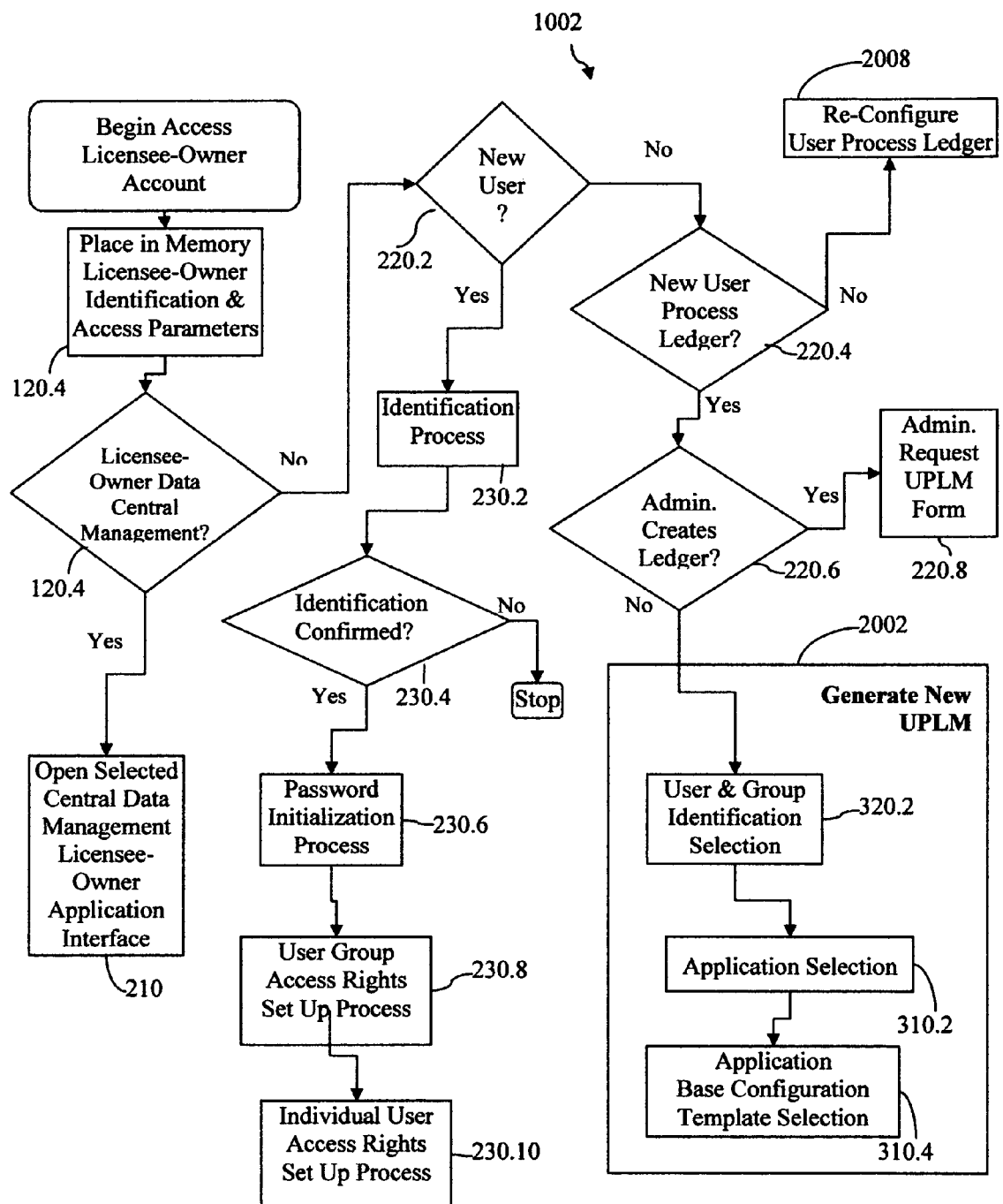
FIG. 3b is a detailed flow diagram of the licensee-owner central application use and access right configuration process of modules 1000 of FIG. 2b.

Flow diagram, FIG. 3b 1002, is the process of the licensee-owner software and data access and authorization. In FIG. 3b, step 120.2, gathers the licensee-owner parameters such as; file and directory access rights, lists of the User Process Ledger Modules (UPLMs) 400 designed by and for this licensee-owner, any parameters significant to the licensee-owner used during central system processing, or any other data needed during the licensee-owner access and use of the central system.

In the licensee-owner specific software account FIG. 2b 1000, the licensee-owner has direct access to their accounts and data management applications, either by using UPLMs with procedures for specific account control or by full standard access as an application licensee owner, such as in the use of terminal servers for remote access. As an example, when the licensee-owners access their data management applications in FIG. 3b and FIG. 2b 210, they may perform direct general data updating and maintenance or archiving of the licensee-owner central software application accounts and associated data, when necessary, or may request central system administrator assistance for these efforts depending on the degree of complexity and licensee-owner configuration templates available.

As a second possible option when the licensee-owner accesses the central system, is the option of adding new remote users to existing licensee-owner UPLMs. In establishing remote user access permission, FIG. 3b, step 230.2-230.10, the system may provide the licensee-owner with step-wise instructions for items such as; initializing a primary password for the new remote user, assigning the new remote user to remote user groups, establishing individual remote user access rights to specific directories, files, and UPLMs, or establishing one to many data files of information significant to the individual remote user and the remote user's work environment as part of the licensee-owner selected business practices. In establishing remote user access permission, these functions, also, may be provided by the central system administrator either additionally, or exclusively.

As a third possible option when the licensee-owner accesses the central system, is the option of changing or adding to existing UPLMs or generating new UPLMs within the licensee-owner account. The generation or updating of the licensee-owner UPLMs on the central system may be arranged exclusively by the authority of the system administrator or may be divided between the administrator and the licensee-owner by the use of licensee-owner configuration templates. If UPLM is to be created exclusively by the authority of the system administrator, or if the UPLMs are not created exclusively by the authority of the system administrator but the licensee-owner requires a new preconfigured template, step 220.6, the licensee-owner would submit a request form to the system administrator for either or both, step 220.8. If in step 220.6, the licensee-owner selects to work from a licensee-owner configuration template, the licensee-owner would next go to the 'Generate New UPLM' series of steps, FIG. 3b 2002. Generating new UPLMs, in FIG. 3b, steps 320.2, 310.2, 310.4 box 2002, may provide the licensee-owner with instructions by selecting, respectively; 1) which licensee-owner remote user or remote user groups may access the new UPLM and 2) which licensee-owner central application the licensee-owner requires the remote user to employ and 3) which related licensee-owner configuration template for that central application the licensee-owner requires in designing their new UPLM.

Generation of these UPLMs 400 can occur by different means, such as by either implementing the entire template as a copy with specific sections of code activated leaving other sections of code inactive, or by a means of interfacing with separate programs such as applets, or by building code and compiling procedures, or by any method capable of carrying out any desired remote user function so long as the proper instructions are provided. Consequently, the UPLM is tailor for a limited set of functions and preferably access permissions interfacing with the licensee-owner applications and data accounts. In the preferred embodiment shown in FIG. 3b, there is only one Application Base Configuration Template Selection, step 310.4, however, if so desired, a storage device 18 may store more than one specific licensee-owner application software and associated base configurations templates to allow a remote user to communicate with a plurality of specific licensee-owner applications and data stores.

The licensee-owner data files, also referred to herein as licensee-owner data stores, FIG. 2d, 100, contain remote user specific data which are manipulated by the UPLMs and stored as licensee-owner stored data, as well as, one to a plurality of licensee-owner data management application software. It should be noted here that, the licensee-owner data management application software on storage device 18 is not altered by the UPLM processing instructions, however, it's data may be accessed and manipulated and it's processing functions initiated in any congruent manner by the UPLM processing instructions.

Figure 3C:
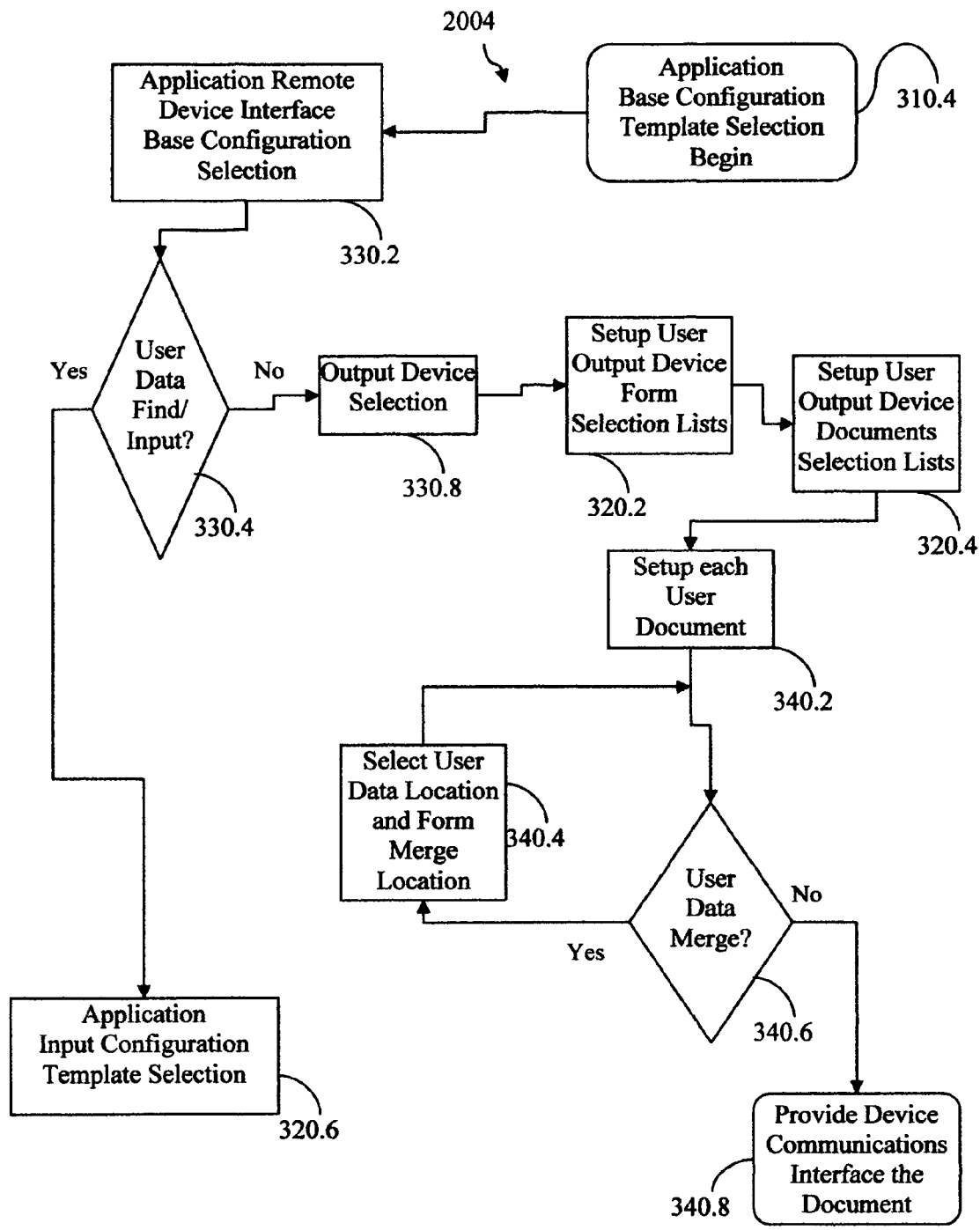
FIG. 3c is a detailed flow diagram of the user central application use and access right data output configuration process of modules 300 of FIG. 2b.

After the licensee-owner selects or acquires one to a plurality of base licensee-owner configuration templates for their central data management application functions, the next step depends entirely on the business work-product requirements of the licensee-owner. FIG. 3c shows possible steps in selecting the data and information output device and output format for that device as a remote user UPLM, or part thereof. The FIG. 3c example for the design flow shows first the device output selection, step 330.8. As with almost all selection steps by the licensee-owner, if the licensee-owner has decided to work exclusively with one item or another, such as a single output device, then this fact may be part of the licensee-owner login parameters and the licensee-owner configuration template could skip that selection step process, here such as step 330.8 for output device selection configuration. Similarly, for the next example steps in FIG. 3c, the next steps are to select output forms and documents, individual documents, and document merges. As well, all steps are optional and can be determined by licensee-owner login parameters. All steps are give as examples only of how a licensee-owner might employ a licensee-owner configuration template to allow specific limited access to remote users to their accounts through specific UPLM generation.

Figure 3D:
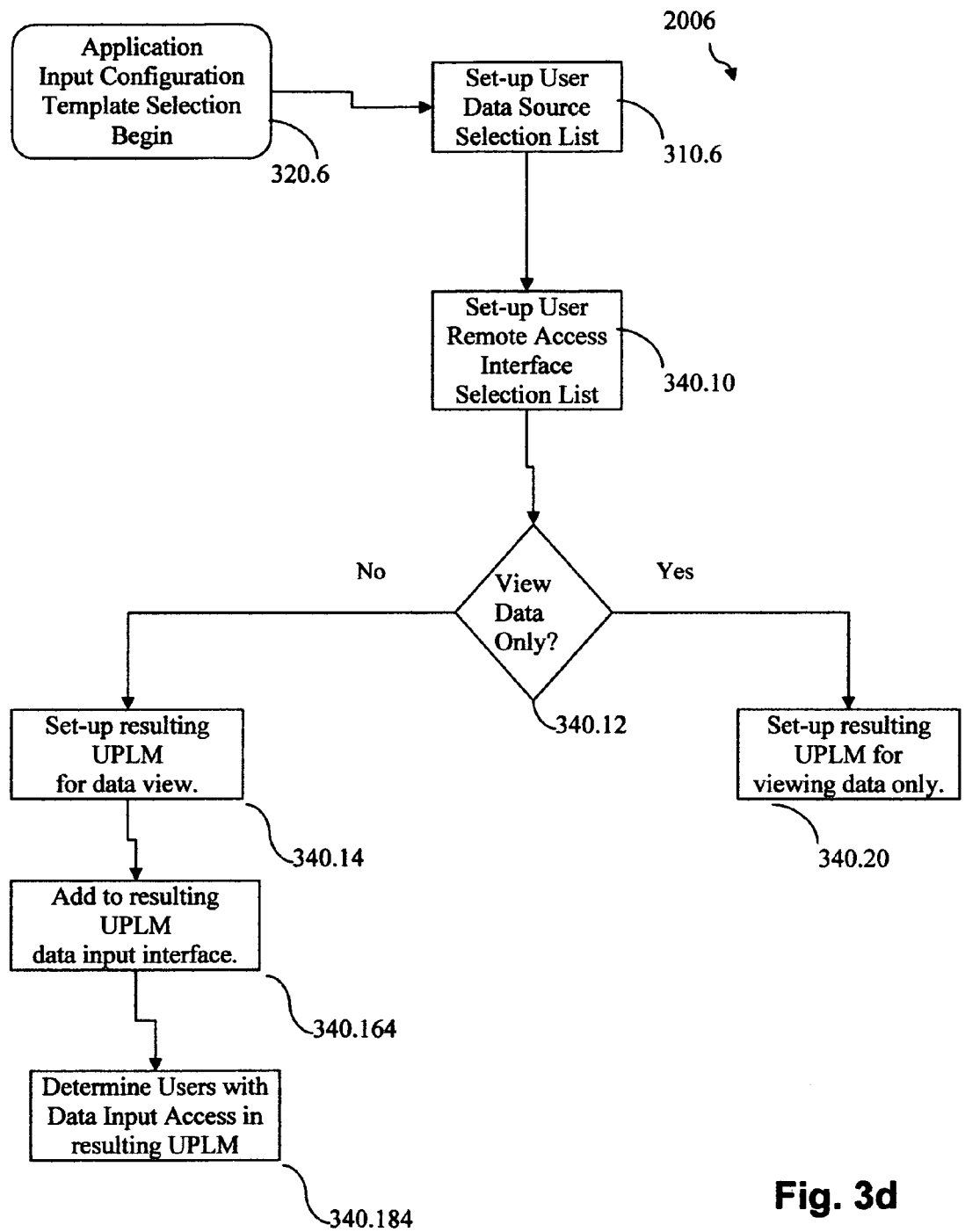
FIG. 3d is a detailed flow diagram of the user central application use and access right data input configuration process of modules 300 of FIG. 2b.

FIG. 3d shows possible data input or data viewing steps for a UPLM design, here limiting the data access to viewing only or to both, viewing and data input. On the same UPLM interface the licensee-owner may decide to add the ability to input data by some remote users but not by others, steps 340.14-340.18. One of several possible means of accomplishing this may be to make the options to add data visible on the UPLM to only those remote users with the access permission parameters set in their login parameters. Remote users without these access rights would not see this on the UPLM interface nor have rights to access the data store for updating the data.

Figure 3E:
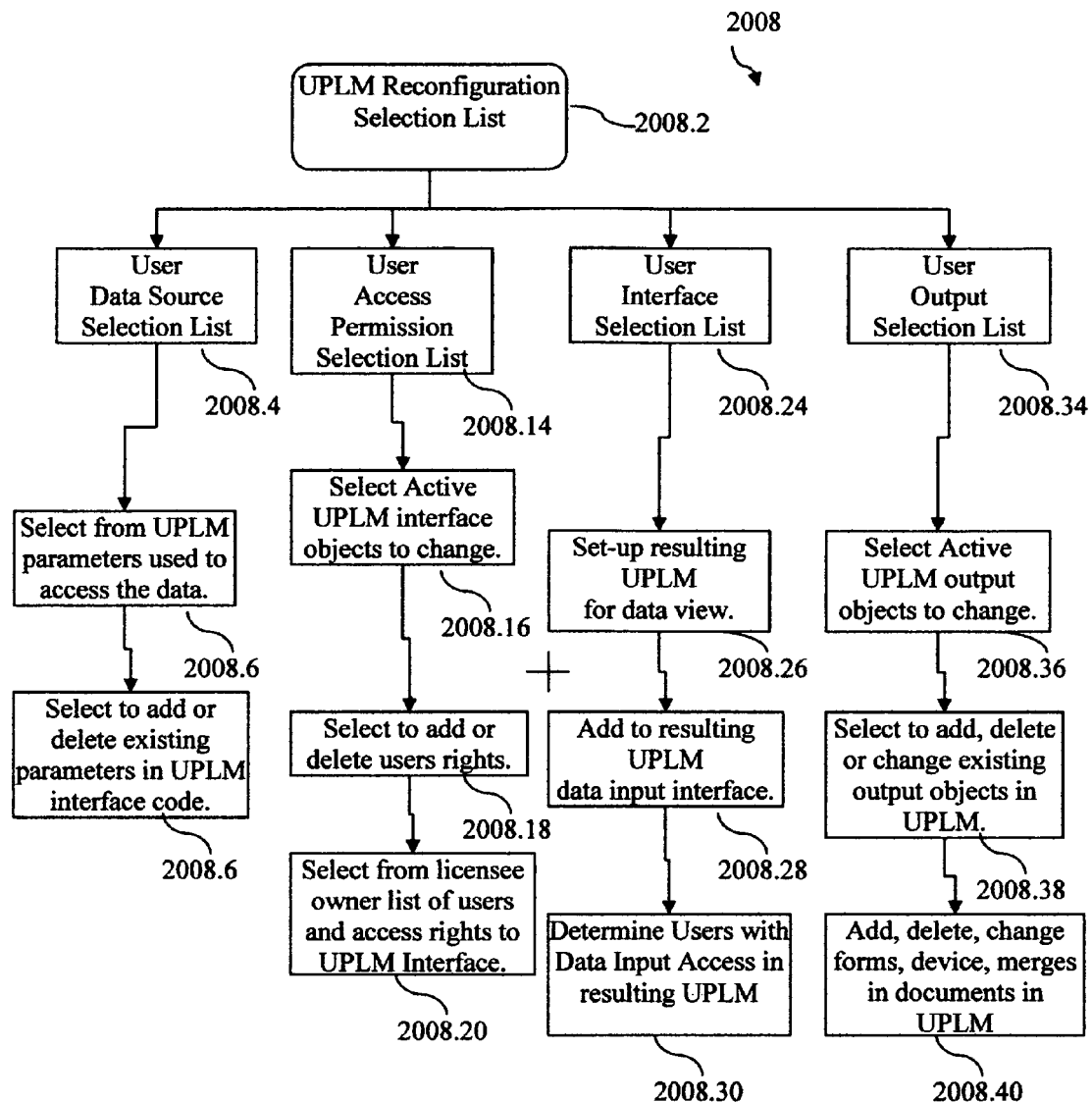
FIG. 3e is a detailed flow diagram of the licensee-owner User Process Ledger Modules re-configuration process of modules 300 of FIG. 2b.

FIG. 3e shows possible steps for a UPLM reconfiguration and updating. Some of the options in this licensee-owner selection may be items such as; adding or deleting new remote users access rights, changing different access rights of different remote users, changing data access locations, changing forms, changing data merges, and changing remote device type access. The means of making the changes may include items such as; adding and deleting code applets or code objects, changing the parameters used in calling the UPLM, changing the visibility of the options on the UPLM interface, or any other means available for changing access, interface, or processing of application procedures and methods. All such a modification is within the scope of the present invention.

FIG. 4: Remote User Principal System Operation

Figure 4A:
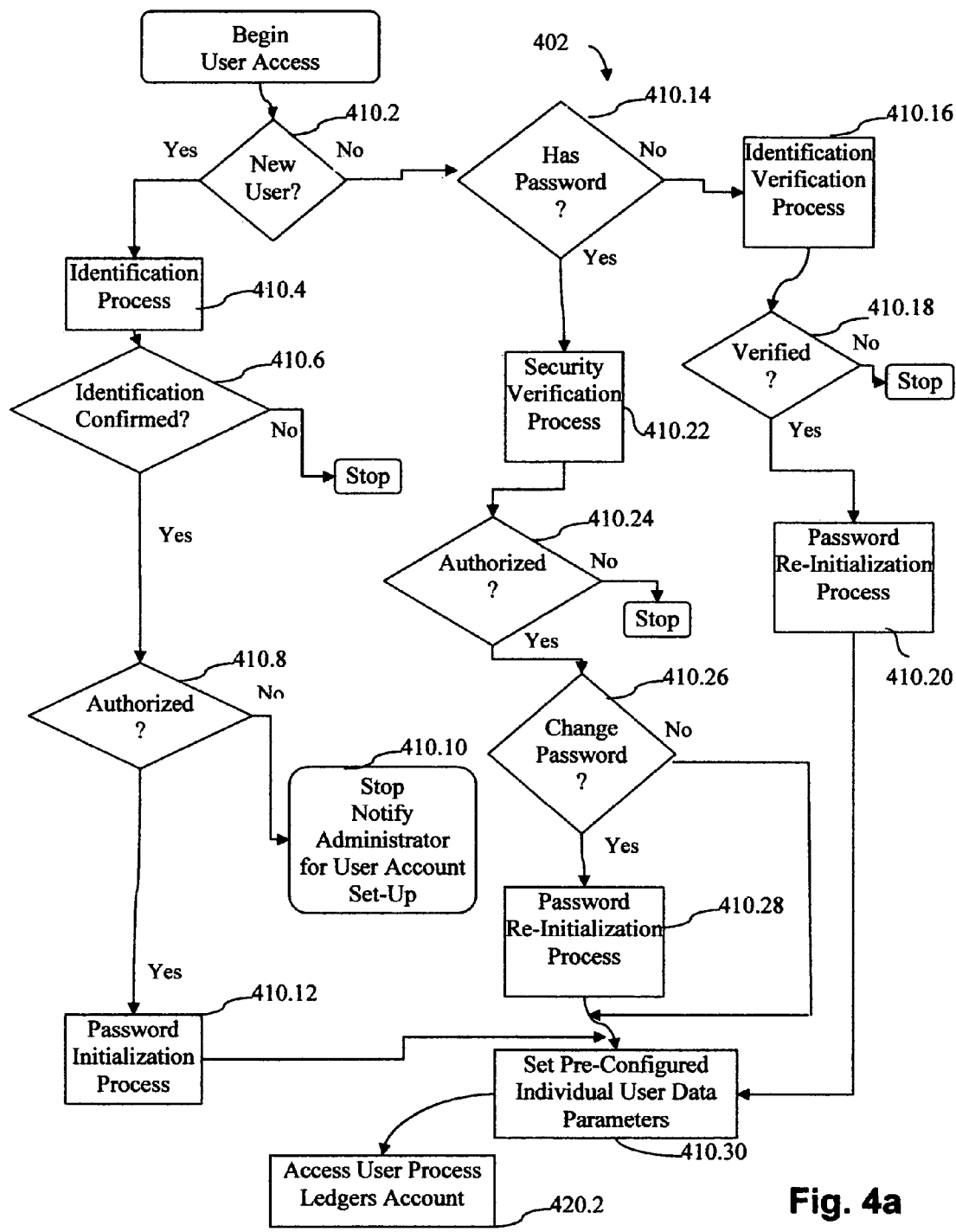
FIG. 4a is a detailed flow diagram of initialization step in the user connection and the access application authorization file of 400 of FIG. 2b.

This high level of access specificity, security, and remote user tracking offered in the UPLM development, in turn, makes it possible for the licensee-owner to conduct important, detailed, work-product development via any general purpose communications link. FIG. 4a, is a detailed flow diagram of initialization step in the remote user connection and licensee-owner UPLM application access authorization.

Again, the Central System User Device Interface File, 540, is the initial program which is loaded and executed by processor 30 to coordinate remote user interaction with system 10. In system 402 of FIG. 4a, after a connection is completed, the systems determines if the remote user is recognized within a specific licensee-owner account. If their identification and their password is confirmed in steps 410.14-410.30, the remote user data parameters are gathered. If they are determined to be a new remote user or if the remote user needs a new password, their identification is confirmed in steps 410.4-410.12, the new password initialization process begins after which preconfigured parameters specific to the remote user are gathered from data sources. Here after the remote users may access the licensee-owner account system through the employment of one to a plurality specific UPLMs to which they have access permission, FIG. 4a 4b step 420.2.

At this point, a special aspect of the stored preconfigured individual remote user data parameters, 410.30 should be noted. These parameters may implement data input into the remote user historical file, 512 and the specific licensee-owner historical file 520 (FIG. 2b, 2c), or function as data input in combination with remote user information for the further processing and data storage. Their configuration and storage in the licensee-owner data system may be accomplished by any number of designated or required means such as; during UPLM generation, during access permission designation, during each remote connection, or during remote user use of the system, some of the user parameters can be added, changed, or updated utilizing remote user option selection requests. Such a modification is within the scope of the present invention.

At this point, a special aspect of the specific licensee-owner application historical file 520 should be noted. As background, the specific licensee-owner application historical file 520 may be used to act as a repository for historical information received from the specific licensee-owner application and associated UPLMs 400. File 520 preferably contains a plurality of historical entries, with each entry having a unique entry designation associated therewith. In the preferred embodiment, each of the historical entries bears specific licensee-owner application user's: identification and recognition data, session counts, UPLM selections, UPLM decision steps, access time, and any other information assisting the licensee-owner in managing and understanding user access to their specific data functions and assisting if accessing errors are encountered. Frequent errors may be address by updating the associated UPLM or adding other UPLMs corresponding to it.

System 10 also serves to ensure that the possibility of loss of data on the storage device 18 or lack of access to the central system 10 is minimized. The remote user devise 12 preferably implements a form of temporary storage (text messages, voice messages, flash memory, compact flash cards). Any form and number is acceptable so long as it is capable of interfacing with the processing device 16 and data transmission is recognized within a UPLM 400. Preferably, once the data is stored in the remote user device temporary data storage system 20, the remote user can later access the central system 10 and once recognized, a selected specific UPLM 400 retrieves the data, preferably by a UPLM 400 designed for the specific remote user device temporary data storage 20 data retrieval. For continuous access to larger volumes of stored data by larger data storage capacity remote user devices, the lack of access to the central system 10 is minimized by a plurality of possible remote back-up data storage systems 22 as back-up systems. With the storage devices 18 coupled to processing device 16, the processing device 16 implements preferably a time sequenced execution of a remote data storage system 22 device interface management program stored either on the storage device 18 or as part of the central operating system 14 to carry out a data back-up ranging from specific user data back-up to an entire system replication onto a plurality of possible remote back-up data storage systems 22. Depending, again, on the remote user recognition and data access rights, some possible remote data storage systems 22 available to the remote user includes; a separate storage device within the same processing system; a separate system 10 as a redundant system connected to the primary system 10 performing data replication between the two systems 10, with each system remotely accessed on separate networks; a network storage unit on different computer type device, a storage unit on a remote computer using a Virtual Private Network (VPN) connection. Any form and number is acceptable so long as it can interface with the processing device 16, and optimally, can interface with remoter user communications device and between the two systems, can implement redundant data storage accessed by one to a plurality of UPLM 400s limiting the user access rights.

Figure 4B:
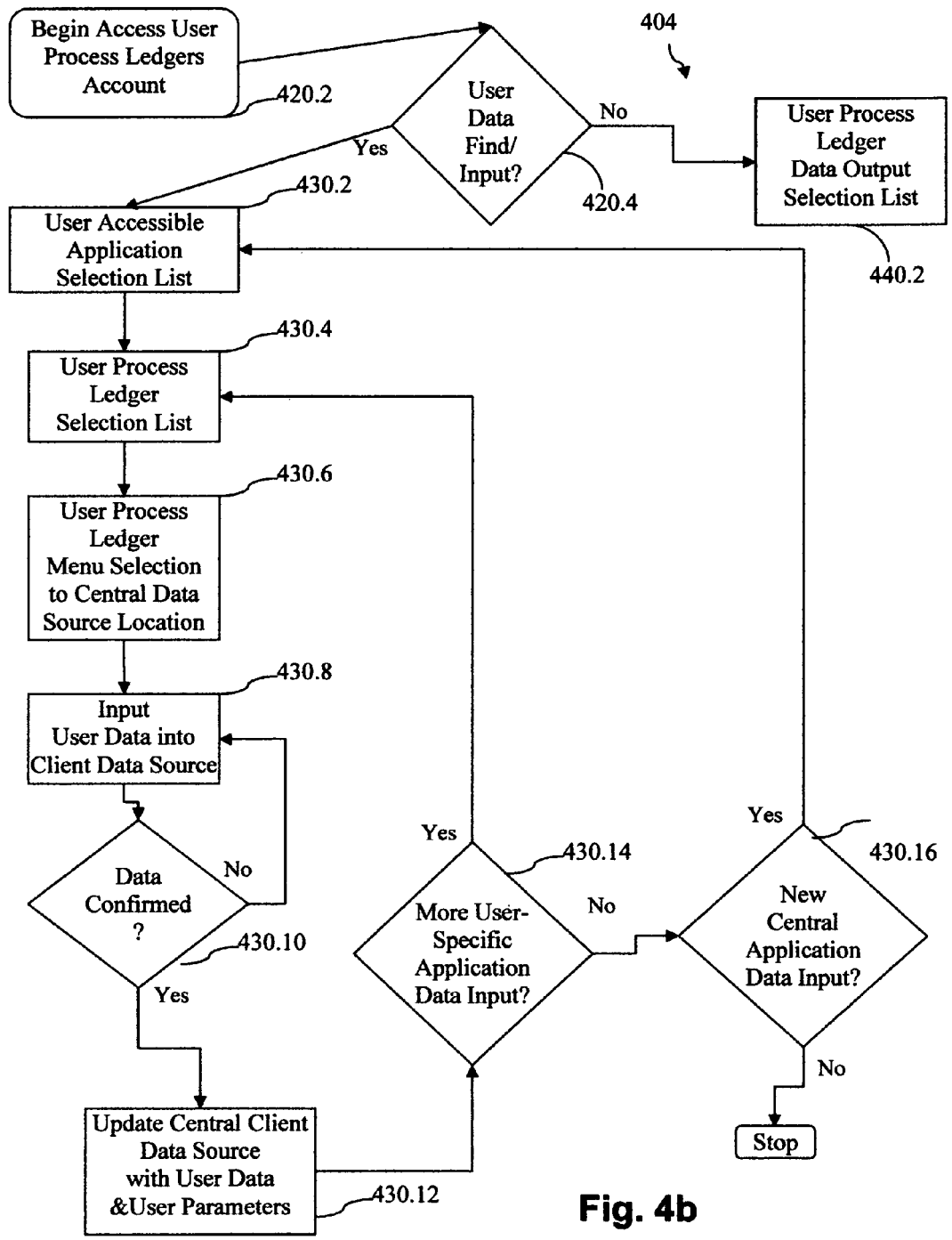
FIG. 4b is a detailed flow diagram of the user central application use and access right data input process of modules 430 of FIG. 2b.
Figure 4C:
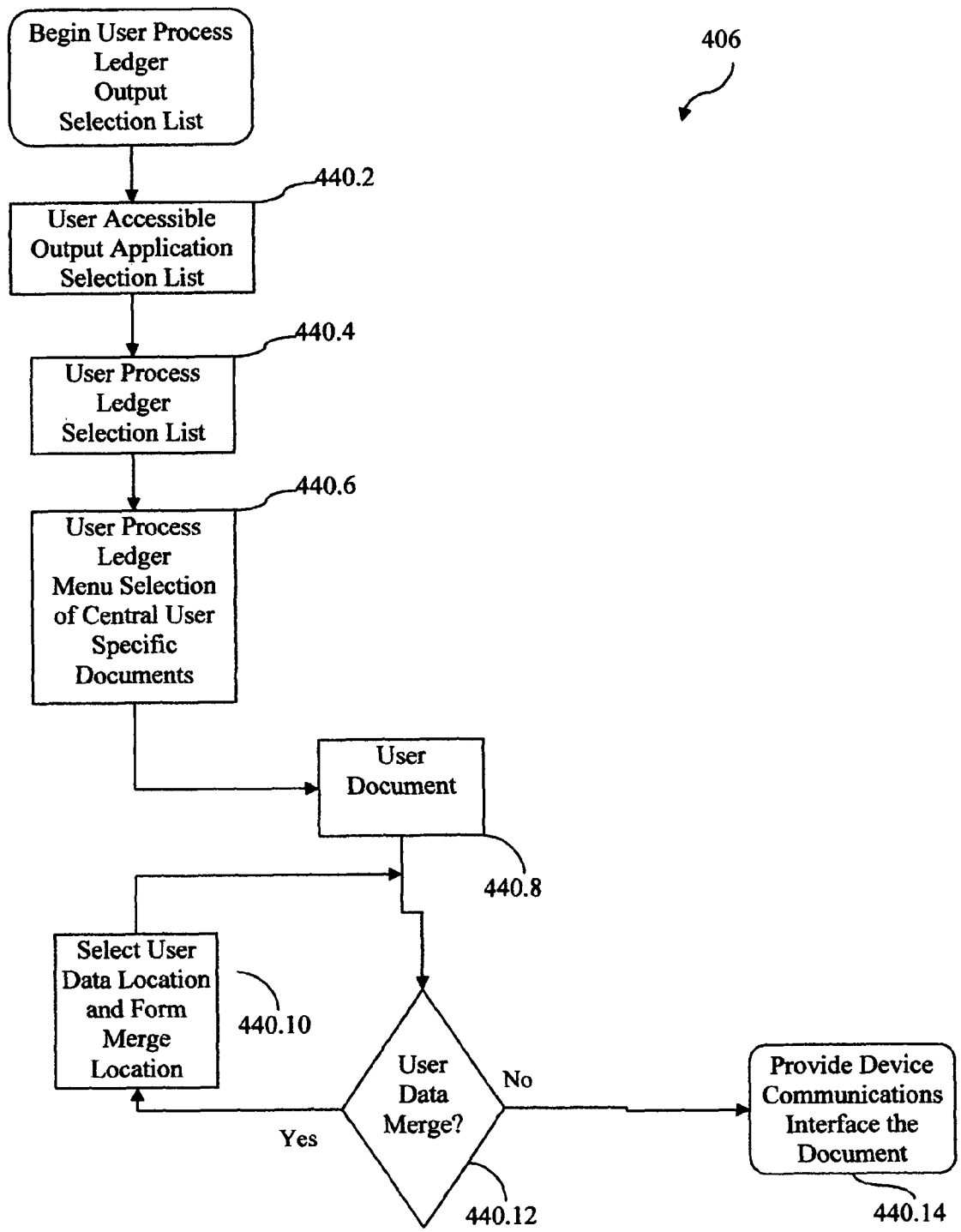
FIG. 4c is a detailed flow diagram of the user central application use and access right data output process of modules 440 of FIG. 2b.
Figure 5:
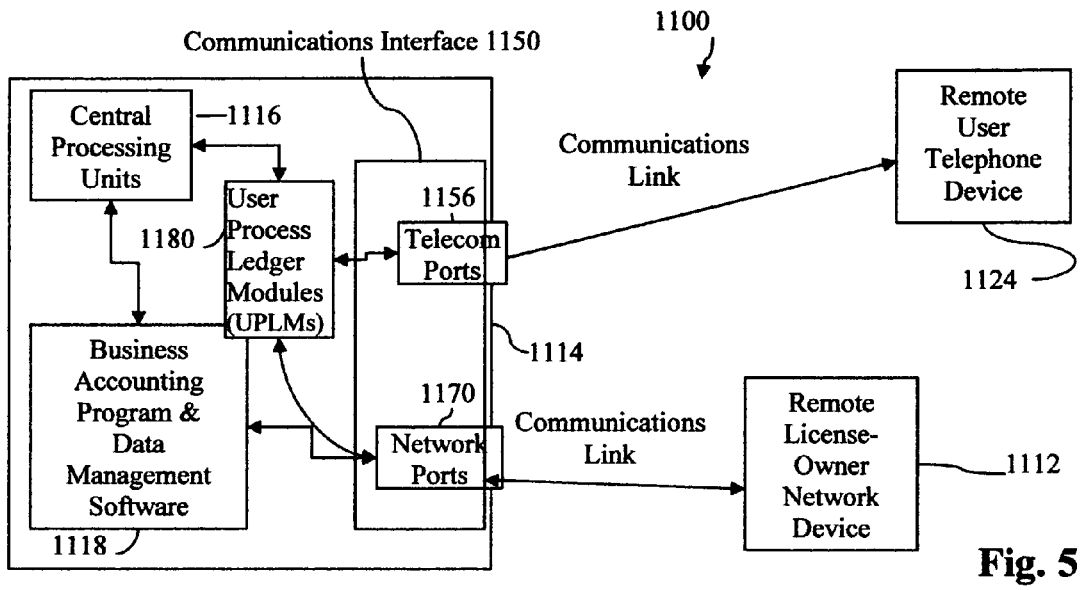
FIG. 5 is a detailed block diagram of the present invention employment as a Business Accounting Program & Data Management Software user interface application.

FIG. 4b, in steps 420.4 to 430.16, is a detailed flow diagram of the remote user central application use and access right data input process of modules 430 of FIG. 2b. A general, non-specific outline of the process of the remote user is to; 1) by user recognition the required licensee-owner UPLM is presented to the user, and 2) user select specific application function or procedure from this UPLM interface, 3) make the specific remote user work-product request or input the specific work-product data. The UPLM will then select the data source and other processing requirements based on the remote user login parameters offering the remote user the proper remote user UPLM interface or data input options. Once the data is input by the remote user, the UPLM confirms the data and updates the data source determining if other data is needed in this or other associated applications. FIG. 4c is a detailed flow diagram of the remote user output request process of modules 440 of FIG. 2b. Again, because of the myriad of processing possibilities, examples of which were described above under the topic UPLM 400, no detailed information is presented here within the flow diagram of any such possibilities. Any licensee-owner work-product specific processing or data management functions within the design of the UPLMs embodiments are within the contemplation of the present invention As represented by the above data input, data processing, and output flow diagrams, the remote user has limited selections in the UPLM remote user interface as to the functions implemented by the modules selected. Most of the decision making is preformed in the background by the UPLM based on the remote user login parameters and function selection. These stored remote users parameters are utilized as the basis of the requirements of the remote users work-product. This highly specified, limited access and very accurate result was not realistically achievable with the prior art systems. Hence, the present invention provides a significant improvement over the prior art.

Representative Applications of the Present Invention

As noted above, one of the major advantages of the present invention is that it can be implemented in a wide variety of applications to achieve a wide variety of licensee-owner specific and licensee-owner circumscribed purposes. To illustrate the versatility of the invention, several representative applications will now be described. Overall, the invention may be applied to at least three broad categories of systems: (1) data communications systems: (2) data and file management systems: and (3) controlled collaborative work-product organization systems. As used herein, a communications system refers to a system wherein two devices exchange information via a communications link, a data and file management system refers to a system wherein a requesting remote device receives limited access authorization to central data management systems and associated accounts via a communications link, and a work-product organization system refers to a system wherein two devices cooperate to accomplish one or more work-product projects in circumscribed manner via a communications link. As defined, these categories are not mutually exclusive: hence, most of the systems described below fall within more than one of these categories.

Work-Product Accounting Data Management and Communications System

The Description and Structure of System 1100

Figure 6:
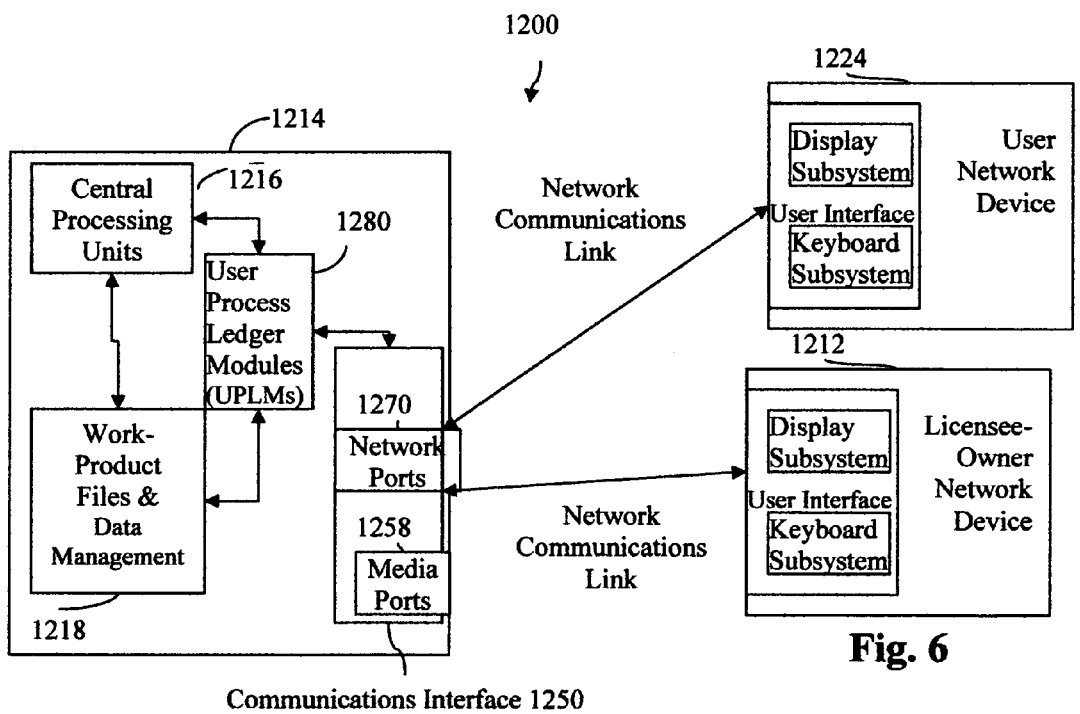
FIG. 6 is a detailed block diagram of the present invention employment as a Work-Product Files and Data Management user interface application.

The description and structure of system 1100 in which the present invention may be implemented is that of data input and processing output business financial accounting and tracking data communications system. A block diagram of such a system 1100 is shown in FIG. 6, comprising remote user telephone device and associated central interface system and licensee-owner remote network device SAAS 11, 1124 and 1112, and a data processing and storage system 1114 including a storage device 1118 for storing the licensee-owner account applications and data. In system 1100, a remote user telephone device 1124, generates a connection to a central system device interface, 1150 by way of the Telecom port, 1156, and once the user is recognized and access is secure, by these access permissions the remote user connects to specific User Process Ledger Modules (UPLMs) 1180. In turn, the UPLMs 1180 processes the remote user requests and data and passes it on to the appropriate receiving business and accounting applications software and associated database tables stored on storage device 1118. Once processed, the financial information is stored on the central storage device 1118 for subsequent reference. This information may be encrypted if requested in the UPLM by the licensee-owner as a further means to restrict access rights.

The User's Use of System 1100.

The remote users of system 1100 generally are users tracking production costs of off-site or mobile work-product projects. In system 1100, for example a remote user may be employees or contractors for a central system licensee-owner employer, hereto referred to as user and licensee-owner respectively. This user may be working with the licensee-owner's client performing labor, purchasing gas and other general operating expenses, purchasing items for resale, receiving payments, receiving deposits, or performing any business function requiring some form of financial accounting. The financial transaction information data, then, is called in by telephone to the licensee-owner's central office computer account system. Upon connecting with the licensee-owner's system, the recognized user immediately accesses that licensee-owner's UPLM or set of UPLMs user interfaces. These UPLMs offer the user, by voice files, only the specific options this user employs in normal daily financial transactions. The user selects a specific financial data bookkeeping option by listening and giving a voice response or optionally by a faster set of memorized series of telephone alpha or numeric keypad selection DTMF tones, herein referred to as DTMF tones, to an licensee-owner defined set of hierarchical selection requests. This selection of options places the users transaction data in the appropriate Chart of Accounts location within the licensee-owner's accounting database system. The user financial data account type and transaction amount is confirmed by voice file to the user. If incorrect the UPLM's voice file option selection system starts again. If the financial data type and amount information is correct the data is updated to the appropriate Chart of Accounts within the licensee-owner's accounting database. The user hangs-up the telephone connection and continues driving or working for the licensee-owner.

Another possible action sequence to the user would be if user limits or delinquent client limits are implemented in the accounting system. The user may be informed of these limits at the time of the calling in the financial transaction information. For example, a maximum amount per period may be imposed on the user's client account to limit the amount that can be spent during any period. When a notice is posted in the user-client's account, that notice will inform the user the next time the user accesses this account using the UPLM user interface that is appropriate for the user and device connection. At that time, the user can decide whether to take action in response to the notice or be given additional instructions.

The Licensee-Owner's Use of System 1100

The licensee-owner determines within the UPLM which financial record within a Chart of Accounts the user can access by offering only a limited set of options within the user's UPLM interface. For example, if one of several user typical functions is buying gasoline using funds from a specific checking account, the UPLM licensee-owner options could include user input access specifically into the automobile expense account of the Administration and Operating Expenses, Chart of Accounts in the licensee-owner's accounting data base. The user's specific checking account, city, and state tax location and other financial information would not be needed from the user during communication because this information would be part of the user login parameters. Thus, the UPLM processing of the accounting data combining the user's parameters, financial data type, and transaction input would post both the debit and credit activity of each transaction within the proper licensee-owner accounting ledgers. Initially, the licensee-owner defines the user parameters, the user's limited access options, and the necessary placement within the Chart of Accounts database within the UPLM only once during UPLM generation preferably using a licensee-owner configuration template of required licensee-owner accounting functions.

The licensee-owner may monitor the system through a network connection and either a different set of licensee-owner UPLMs or by direct access to the accounting management application software. However, if the user UPLM interface are configured correctly accessing the Chart of Accounts database locations and accounting application functions, the licensee-owner can request to receive daily or monthly end-of-accounting period balances and reconciliation statements and receipts by FAX or other means. If all financial data appears appropriate, no network monitoring would be required.

In this preferred embodiment, in addition to being a regular financial transaction bookkeeping and tracking system, financial processing and UPLM presentations may further comprise; cost performance and analysis management systems, cost volume profit analysis, profit planning and control systems, transfer pricing, capital expenditure decision systems, other financial statements, foreign currency markets and exchange applications, time value of money analysis, capital management applications, capital budgeting and cash flow analysis, capital structure analysis, income scheduling and reporting applications, and any other accounting, financial reporting, and related data applications and presentation.

The Operation of the UPLM for System 1100.

The UPLMs input the user's financial transaction information to the exact location within the licensee-owner's financial accounting system on the central computer system employing a series hierarchical option requests. Thereafter, this or other UPLMs processing preferably handles all the required accounting functions for the licensee-owner's business accounting practices, including such items as central system date scheduled UPLMs execution for licensee-owner's end-of-accounting period; account balancing and reconciliations, income statement, balance sheet, cash flow reporting, electronic tax filing and any other accounting, budgeting and forecasting functions. These and other financial accounting applications are within the scope and contemplation of the present invention.

Thereafter as well, this or another UPLM processing and associated data management applications preferably handles all the required data storage functions. The data storage functions preferably includes confidential data encryption and decryption with the encryption keys and parameters changed on a regular basis within the means of one to many UPLMs. As well, after login recognition, accessed UPLMs stores and inputs additional users specific parameters into the accounting system, such as the user's known city, county, and state sales and revenue tax percentages and requirements, commission percentages, negotiated client discounts or any other financial percentages relating to the specific UPLM user.

Other applications of the implementation of the present invention example include the use of a Global Positioning Satellite System (GPS) information within the UPLM. Many wireless telephone systems today are coupled to a Global Positioning Satellite System (GPS). The data from this system could be managed within the licensee-owner account and processed for licensee-owner specific accounting purposes in the case of payment for transit of goods and services. This procedure, also, could be utilized similar to an employee work time-clock punch in and out accounting means. Additionally, certain retail item code, using a bar code reader's data or by code data input communicated to the UPLM may inform the user that certain items such as; bad parts, similar but inadequate parts, poorly manufactured or engineered parts, etc. should not be purchased by the user for this project. As well, user limits, delinquent client limits, can be transmitted to the user informing them of these limits at the time of the transactions or purchases. Another part of this licensee-owner application processing may include linking to on-line money and banking accounts including checking, and credit card accounts. Confirmation codes generated during linking to on-line money and banking accounts transactions in this manner could be recorded in separate user or licensee-owner historical files as well as within the licensee-owner account data storage system, or database. Furthermore, this data could then be used in additional UPLM processing applications.

The Configuration of the UPLM for System 1100.

In addition to the general configuration means of the UPLMs, licensee-owner configuration templates of system 1100 preferably requires a data source of voice files requesting user input by either DTMF tone recognition or by voice recognition of UPLM option selection for proper placement of the user transaction data within the licensee-owner accounting database. A possible licensee-owner configuration template might include licensee-owner accounting database object selection lists combined with associated licensee-owner voice recording of licensee-owner desired user action options or user instructions to implement the data management objects. This would then generate the licensee-owner business specific UPLM process for the selection of the licensee-owner user specific financial transaction. Again, the means of UPLM generation can range from a single custom application designed by a programmer for a single user to multiple UPLMs designed by multiple central application licensee-owner configuration templates for multiple users or licensee-owner specific application templates designed herein to access and manage specific licensee-owner financial data segments within their Chart of Accounts accounting system. This is within the contemplation of the present invention.

Document, Records and Evidence Work-Product Organization and Presentation Management System The Description and Structure of System 1200

Thus far, the invention has been described with reference to remote user devices communicating with SAAS's. It should be noted, that with minor modifications, private Virtual Private Network (VPN) and public internet communication link access can be accomplished by the present invention, as well. For a number of years internet portals have been available for work-product collaboration. These portals are very similar to desktop applications in appearance and in user options with selection and access capabilities left to the discretion of any person on the portal able to import or edit a web page. Very little standardization or direct and consistent implementation is available offering access limitations only on specific licensee-owner files and directories. Application implementation generally requires extensive knowledge of the application software and custom system development requires the collaboration of not only the web masters and IT staff but also the professionals using the portal. The expense in time of many people in joint collaboration is seldom worth the effort as requirements and agreements often change from project to project. This is especially true in situations where the users are in short term project ventures or business technology consulting relationships. Here especially a controlled collaborative centralized system would be extremely useful and far more efficient. The licensee-owner and consultant users adapt their immediate needs to a familiar format of a licensee-owner configuration template with only minor adjustments for UPLM generation on each project type. The collaborating users are already familiar with the licensee-owner central system and the custom implementations and are in this manner familiar with the existing system. Expectations and limitations are directly address within the User Process Ledger Modules (UPLMs) and thus options and access can be limited to 2 to 3 choices with the implementation of the user input reserved for the application processing direction by the UPLMs. This type of system can be particularly useful within our legal system shown in FIG. 6. Where certain aspects of each pleading and judicial decision can be noted and filed within an attorney's account database for each individual legal file all presented within a single specific UPLM design.

System 1200 preferably comprises a data processing and storage system 1114 including a storage device 1118 for storing the user account applications and files, UPLMs, and the data incorporated therein, and remote user systems SAAS 1224 and 1212 for both user and licensee-owner designated file manager each having user interface device modules 1250 incorporated therein. Thus far, SAAS interface modules 50, 1150, 1250, have been described as software modules which are executed by processor 16,1116,1216, respectively. It should be noted, however, that these and other device interface modules may also be implemented in hardware. This is within the contemplation of the present invention. The central data processing system 1214 shown in system 1200 are substantially identical in construction to the 1100 except that the remote user's UPLMs of system 1200 preferably further comprise visual User Graphical Interface (GUI) instead of auditory voice files interface. As well, the remote user device 1224 and remote licensee-owner device 1212 differ in that they are visual devices with required either or both public or private network connections as the communication links with the ability to request and respond to any standard or custom network browser procedure or applet application within or separate from the UPLMs. The UPLM modules 1280 are executed by processor 1216 whenever the SAAS's 1224 or 1212 wish to communicate with the central licensee-owner account. Each UPLM is customized prior to user login to display and accept information according to the remote user permission to files and information.

The User's Use of System 1200.

The users of system 1200 generally are users employed tracking presenting, and reviewing files during production of a collaborate work-product. In system 1200, for example a user may be employees or collaborators with a central system licensee-owner attorney, hereto referred to as user and licensee-owner respectively. This user may be working with the licensee-owner's client files performing file development, gathering pleadings and court documents, tracking all associated files and presentations or performing any legal record keeping function requiring some form of file or document management. As an example, a licensee-owner data store directory of files managed by component application functions within one or more UPLMs 400, each file having several applied corresponding file parameters such as: a file name, a file directory address, a file access code, one to a plurality of work-product file status parameters including production costs, a file remote interface connection code, a file licensee-owner application interface code, and a file licensee-owner application component functions and processing code. One or more UPLMs may perform a number of related functions with reference to these licensee-owner directory of files. In this example, after a remote user and device are recognized and pass a security methodology system, UPLM can display by a grid on the remote users display screen all the user files or user limited access specific files, by name, within a designated licensee-owner directory. This UPLM grid may then allow the specific remote user access to only view or edit information, comments, and some to all of the above mentioned parameters for each file. If the UPLM recognizes this remote user as having permission to add files, additional parts of the UPLM may become visible to only that user. With this access permission, the user may then request a prepared file to be copied to the central system licensee-owner file store within a specific licensee-owner directory from their own specific file store on their personal computer. Next, the UPLM calls on its own code objects that recognizes the new central system files within the licensee-owner directory and adds the names to a file-name, table-field list in a central database. This database table contains the information displayed on the remote user's UPLM grid allowing the above mentioned editable file information to be applied to each of the licensee-owner files listed. As well, the UPLM grid can offer a means to view each file using either central system display applications or applications on the users desktop computer. An example of this would be an application able to read .pdf files installed on the users computer in order to read the .pdf files on the central file data store listed on the UPLM grid, or Microsoft's Power Point Presentation software installed for Power Point file presentations. Once the files and associated images are reviewed, the user may return to the UPLM display grid to edit and add additional comments to the file information stored in the associated database. This is but one example of the multitude of uses of this embodiment contemplated in the present invention for managing business work-product documents and information. The UPLM controls the access to the files and documents directory as well as the database of information related to the files.

The Licensee-Owner's Use of System 1200

All access to every client document, file and associated information is securely limited by recognition of access rights within the UPLMs and the system as a whole upon user connection. All the licensee-owner has to do is set-up the directory structure for the files and documents and set-up the user access rights to their client directories all within an licensee-owner configuration template selection means. The licensee-owner determines within the UPLM generated which client directories the user can access by offering only a limited set of options within the user's UPLM. For example, if one a user's typical functions is the tracking of time and the cost of the document or file production according to a specific attorney's client time records, the UPLM licensee-owner options would include user input access to the time and cost fields of only the attorney's database document information fields in the licensee-owner's document management database. The input device may vary and is not limited to browser on-screen access only. For instance, system recognition of DTMF tone telephone input through a Telecom interface within a UPLM may also add to the cost data already existing in that attorney's client file database information fields. Initially, the licensee-owner defines the document classification system, the user's parameters, the user's limited access options, and possibly the field placement within the document management database in the UPLM and any other needed processing information only once during UPLM generation.

Preferably, the licensee-owner monitors the central data system through a network connection and either a different set of licensee-owner UPLMs or by direct access to the document management application directory system. The licensee-owner can view the day's new or all client's document list and associated information such as comments placed in the database about each document or file, or view directory access location of recorded voice or video files, that may be accessed by any number of remote devices such as a network browser (coupled to an auditory means), telephone, FAX or other data communication means. In this preferred embodiment, in addition to being a central document tracking system, document and file processing may further include evidence presentation management systems including connected central system networks linking disparate video and graphical data file management systems.

The Operation of the UPLM for System 1200.

After user connection, recognition, and gathering of user access permission rights and other parameters, the UPLMs employing user options may access and input files and documents into exact location within the licensee-owner's file and document management system, such as within a central system directory structure. The UPLM controls the access to the files and documents directory as well as to the database of information related to the files. In system 1200 FIG. 6, UPLMs determine the type of user access, as well as, present documents, files, and file information, again, determinant upon user rights. User rights determine a user's access to files, directories of files, links to files on other networks, file information, and whether files and file information maybe add to the licensee-owner directory and data structure or not.

As an example of this UPLM operation, if the user is given special download access permission rights within the UPLM, the UPLM allows this user to select a set of document and files on their own system or a separate network location to download to the licensee-owner's data source central system. In the UPLMs processing of the document storage, the UPLM interface then displays a user submit procedure acknowledgment on the UPLM. Options in the UPLM set the filing options thus accessing or generating a file source directory location and file name placing the files and document in the appropriate directory. As an example of these UPLM file location processing options, the selected set of options may place the file name and location information in the proper field and row locations within the licensee-owner's document management database, or UPLM processing instructions employing system directory access and new file recognition programming may do the same. Once in the database, the UPLM then offers this user all updateable grid database fields for additional information input on the new centrally stored documents and files. The document type and additional information data is displayed on a grid containing the other files and document information within the attorney's client directory on the central system. The UPLM interface then displays a user submit procedure acknowledgment on the UPLM. If incorrect the UPLM's interface information input selection system refreshes the edited data fields and starts again. If the document type and additional document information is correct the UPLM updates the new data to the appropriate client database location within the licensee-owner's directories and document management database. The UPLM controls the access to the files and documents directory as well as the database of information related to the files.

Thereafter, this or other UPLMs processing preferably handles all the required document, file, data storage and presentation functions for the licensee-owner. Presentation function examples include central system UPLM implementations of evidence videos which may be located on separate network linked media servers. As well, after login recognition, accessed UPLMs may store and input additional user specific parameters into the licensee-owner database system or historical files relating to the specific UPLM user access event. Further examples of UPLM document processing may include linking to on-line court filings for document downloading. Confirmation codes and the copied document files generated during linking to on-line court filings in this manner could be recorded in separate historical files, as well as, within the licensee-owner directories and document management system database. These and other document management applications are within the scope and contemplation of the present invention.

The Configuration of the UPLM for System 1200.

In addition to the general configuration means of the UPLMs, licensee-owner configuration templates of system 1200 requires a data source directory for the work-product documents and files with the file names and location data placed within a licensee-owner directories and document management database. As an example, these templates may offer the licensee-owner a selection of network browser type pages which display user option selection, client file directory name selection list, users and associated user access rights lists for limiting a user's directory access selection, and any other configuration code further limiting and defining access to the licensee-owner directories and document management system. The template code then utilizes the licensee-owner parameters, licensee-owner selection of; client lists, user access rights, directory paths, and database file location fields in the generation of a new UPLM. Thereafter in this example, depending on the user access rights, components of the UPLM may be visible only to selected users. These components may include the ability to view the list of files in the client directory on the licensee-owner central system, or the ability to view the files within the client directory and add information about the file, or the ability to add files to the client directory.

Again, here, the UPLM is limiting the specific user access to a work-product source on an licensee-owner central system and providing the interface and background processing as defined by the licensee-owner work-product management requirements. This is within the contemplation of the present invention.

Work-Product Operations and Tech Support Data Management and Communications System The Description and Structure of System 1300

Figure 7:
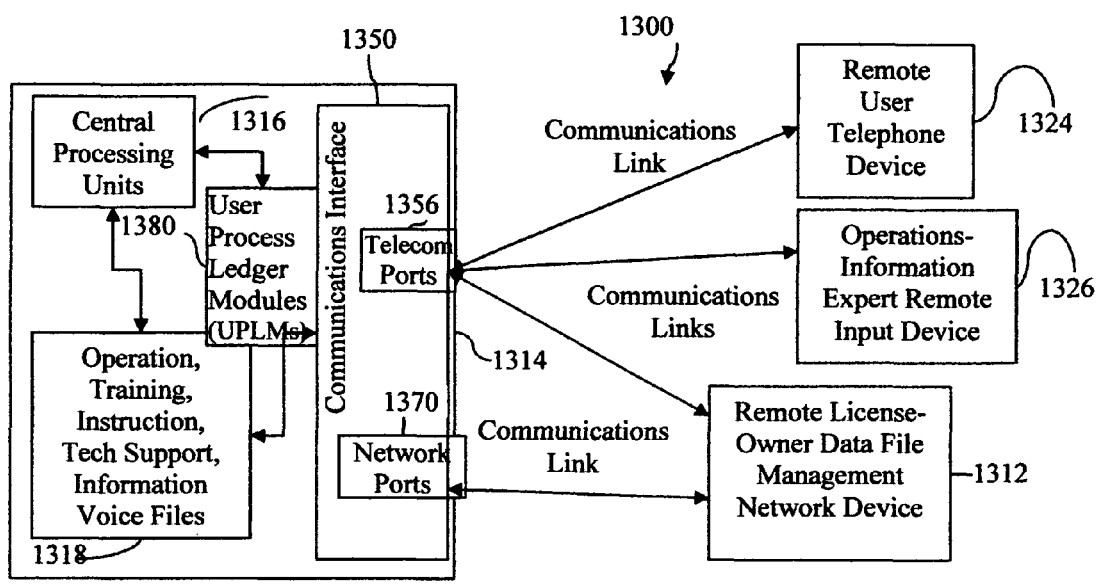
FIG. 7 is a detailed block diagram of the present invention employment as an Operation, Training, Instruction, Tech Support, Information Voice Files user interface application.

A controlled collaborative work-product organization system in which the present invention may be implemented is an Operations, Training, Instruction and Tech Support Communication System. More than a searchable knowledge database, this embodiment of this invention users do not waste time searching through reams of technical information to find the issue and concerns of their immediate need to act upon. Instead the user can reach the information they need through a series of related interactive questions related to their specific operation. Such a system is shown in FIG. 7 1300, comprising telephone or other audio communications device SAAS 11, 1324 (optional licensee-owner remote network device SAAS 11 1312), a central device interface, data processing and storage system 1314 including a storage device 1318 for storing the user account applications, data and voice files. In system 1300, a user telephone or other communications device 1324, generates a connection to a central system device interface, 1350 by way of the Telecom port 1356 or other communications port, and thereafter accessing user specific User Process Ledger Modules (UPLMs) 1380. In turn, the UPLMs 1380 processes the user requests for voice files, other data and informational files such as user specific operations, training, instruction and technical data. Thus connecting the user with the appropriate voice files and associated applications software by the UPLM response processing.

The User Operation of System 1300

The users of system 1300 generally are users employed in new operations during production of work-product be they consultant, client, patient, contractor, or employee. This user may be working with the licensee-owner's client performing new; labor, specific operation, or any licensee owner specific operation, hereto referred to as operation. Each new user performing the operation will be provided access to a set of UPLMs containing all of the necessary information to perform that operation, immediately accessed by telephone to the licensee-owner's central computer account system. Upon connecting with the licensee-owner's system, the recognized user immediately accesses that user's UPLM or set of UPLMs. The UPLM interface preferably comprising voice files of descriptive options of each part or section of the operation. These sets of options do not change however specific options within the sets may be changed by users with access permission. The user selects the set of options by listening and giving a voice response or by a faster set of memorized DTMF tones moving through the sets. This selection of options confirms or selects each step of their performance in the new operations, the UPLM offers further informational voice file hierarchical options each dependent upon the results or selection from the previous step. The user step of their performance in the new operations is confirmed by voice file to the user. If incorrect the UPLM's voice file option selection system starts again and records the problem in a user-operation historical or database file. If each step of their performance in the new operations is correct the data may be updated to the appropriate operations tracking data source within the licensee-owner's operations tracking database. The user continues to listen to the next instructions or hangs-up to complete the present task step.

With each step in the operation completion confirmed and placed in a user-operator database in this manner, the operator does not waste time searching through reams of technical choices and information to find the issue and concerns of their immediate need. Additionally, if using a hands-free remote device, the user is hands-free and eyes free to perform the labor while listening and responding to the requested instructions, New operator instructions maybe input into the voice file data source, by the other previously experienced operators working on the same process.

Additional features may include the requested informational files presented in the form of; video or voice files for broadcast and audio output, voice, image or video files of work-product results or operations for output with scroll and search from telephone displays, broadcast displays and hand-held devices. Examples of additional output file types may include; output of sales and marketing guarantees, product specifications, user personal notes, as well as general technical support information.

At this point, it should be noted that in system 1300 the same informational UPLM voice file may be used over and over again to inform one to a in multiple of employees or users simultaneously. This is because the same UPLM can be implemented by a multiple of users simultaneously, since the only change to the database is by the experienced users within a UPLM process. The database table objects are locked from access only during the microseconds it takes the UPLM to input the experienced user's voice file name and location not impacting access to the user significantly. As well, since access to this information is by voice recognition or optionally by a series of alpha or numeric keypad selection, no continuous visual information or tactile response need be included in request transmission or in the information accessed. Thus the advantage is the user can continue to work or drive while reviewing the files.

The Licensee-Owner's Use of System 1300

The licensee-owner determines within the UPLM which directory or set of recorded voice files the user can access by offering only a limited set of options within the user's UPLM. For example, if one of several experienced user typical functions is operating a special production machine in a specific product manufacturer, the UPLM licensee-owner options would include user input access specifically into the specific product manufacturer voice file account of the special production machine account in the licensee-owner's production voice file data source. The data on the experienced user's specific special production machine, specific product manufacturer and other operations experience information would not be needed from the user during processing because this information would be part of the user login parameters. Thus, the UPLM processing of the specific product manufacturing experience and operating a special production machine would be established as the user options when connected to the UPLM. Preferably, initially, the licensee-owner defines the user operational experience parameters, the user's limited access options, and if necessary the user's voice file placement within the directory listing of recorded voice files only once during UPLM generation utilizing a licensee-owner configuration template.

Thereafter, the licensee-owner monitors the system through a network connection and either a different set of licensee-owner UPLMs or by direct access to a specific directory and field within a files database management system including historical files of repeated instructions and incorrect step selection in the new user UPLM step selection process. From this information new operations, operating procedures, or operating instructions may be refined or recorded for the new operators.

In this preferred embodiment, in addition to being a regular operational information system, recorded voice files database, processing may further comprise; operational tracking system, operational error management systems, operational cost volume profit analysis, operation and product quality control analysis, manufacturing capital expenditure decision systems, production manufacturing systems analysis, time value of money manufacturer analysis, scheduling and reporting applications, and any related production operation applications based on operational information gathered within the database of operational voice file locations and information on operation outcomes.

The Operation of the UPLM for System 1300.

An example of the management of individual UPLM components within this invention may be to only exposed to experienced users by access permission recognition specific management components on the UPLM while others using the UPLM would not be exposed to these management components. These specific management components on the UPLM may include hierarchical selected voice file generation options which are added to the directory and updated within the UPLM by the experienced operators. These updates may include new operational categories within the base UPLM category, additional voice files within an existing category or directory, or any other UPLM structure change necessary to more fully access the appropriate informational voice files. Through UPLM processing, or by a separate central application processing, the updated UPLM then recognizes these new voice file requests and associated informational voice files and offers them to the new operator or user as additional possible request options the next time the UPLM is accessed.

Again, herein, the UPLM is limiting the access to a work-product source on an licensee-owner central system and providing the interface and background processing as defined by the licensee-owner work-product management requirements. Again, as well, the means of UPLM generation or update or management can range from a custom UPLM application designed and updated by a programmer for a single user, to multiple UPLMs designed by a central application licensee-owner configuration template or licensee-owner specific template resulting in the generation or update each individual UPLM, to the use of special access by specific users to separate base components within the each individual UPLM resulting in the individual UPLM to be updated or managed. This is within the contemplation of the present invention.

As an example of an additional aspect, as part of a business team collaborative effort, a supervisor of work teams given special access can record and implement specific voice files for a specific work team of UPLM users. The supervisor may also request voice file response by an alpha-numeric keypad or voice recognition option selection on the present day project related issues. Each response may be recorded and the recorded file location information placed within the database of the central system, prior to upcoming meetings or project decisions. The voice files can be review several times before a user response is issued allowing for further deliberation and further research, and avoiding the gridlock of everybody responding off the top of their heads at the same time during face to face or brainstorming meetings. With daily informational or preparatory information, such as specific industry news reports, the user can review the voice files, and respond if requested while driving or in route meetings or work. An advantage here being that the user can be remotely working while in traffic since this system does not require visual or tactile access. Other advantages of this example is that answers and opinions can be processed, tallied and calculated, and voice files filed or located within specific locations in the central system database, for access by other project team members at a later time when this information is relevant then to them.

The Configuration of the UPLM for System 1300.

In addition to the general configuration means of the UPLMs, licensee-owner configuration templates for system 1300 preferably requires a data source of recorded voice files either informational voice recorded files or voice files requesting user input by either DTMF tone recognition or voice recognition of option selection or for experienced or team user voice files to be recorded. An example of possible configuration template might include hierarchical database object selection list of licensee-owner account database fields with each additional field selected, the combination of which further narrows the possible categories or file locations of files available to the user for the response. Such selection of database fields for location specific directories or other categorization of voice files would be applied to the specific base UPLM for the related specific operation voice file selection. In addition, within the selection of informational voice files specific data field could be added to the file location table such as date fields or operational outcome calculations on quality control parameters, the selection of which may be designed as such in the licensee-owner configuration template.

The important difference in system 1300 and the others is the ability to change actual individual UPLM's responses to user requests by changing and adding to the base UPLM field of voice file directory selection. Common to all embodiments of this invention, in addition to directly interfacing with the central system at this system location, is the optional ability to interface through a network, such as the internet, to a central system of applications for the purpose of updating and generally managing the UPLMs or central system licensee-owner data sources. Full or limited access to the central system may be assigned to specific users by the licensee-owners. However, in this invention embodiment, permitted experienced and team users may add and change individual UPLM database field options not only by the optional visual network interface access but also by an audio interface through a audio communication device interface, updating and generally managing the individual UPLM database field directory location and voice file list. This is within the contemplation of the present invention.

CONCLUSION, RAMIFICATIONS, AND SCOPE OF INVENTION

The invention has now been fully described. While the invention has been described with reference to specific embodiments, the invention should not be construed to be so limited. Various modifications can be made by those of ordinary skill in the art with the benefit of this disclosure without departing from the spirit of the invention. All UPLMs are dependent upon the applications and business practices of the central system licensee-owner, and may be sold as such, whether the central system be a single computer or a web farm or a widely dispersed internet system. For example a physician's after-hours computer answering service may give users the options of user specific items such as, change appointments, outstanding charges, laboratory results, or actions to take for symptoms of an illness. In combination with user password and user data parameters the UPLM could respectively, check physician calendar compared to client calendar parameters offering new dates, check the recent charges to and payments by the user, check if laboratory results have arrived, compare symptoms of illness with patient's known maladies and suggest possible solutions or immediate action. Again, as with other modifications to the UPLM, UPLM requests and actions are licensee-owner determined, combines information in an existing licensee-owner database about user for UPLM user options, applies information from an existing licensee-owner database about user with user's requests and replies, combines requests with existing data management applications, updates existing user and owner database with new user information (symptoms, dates, and possible immediate action), can direct the user to the next step, can output new and processed data to other communications links such as FAX to a hospital emergency room, keeps a historical user or owner log file of the processing, and assures the information is secure by using user password and possibly remote device recognition.

This and other modifications are within the spirit of the invention. Therefore, the invention should not be limited by the specific embodiments used to illustrate it but only by the scope of the appended claims.

The invention claimed is:

1. A system for centralized collaborative licensee-owner information account computer management of data, wherein the data is input into specific licensee-user data sources which is not necessarily employing a remote information computer access, comprising;

central digital data storage and processing components which includes at least one remote access device interface component;

remote user access transmitting discrete units of user specific work-product data and data output requests;

associating said user specific work-product data with one to a plurality of user process ledger modules (UPLM), wherein the associating comprises;

a selection of one to a plurality of UPLMs implemented as discreet units to accomplish specific application tasks, and user specific data input options which are placed into an intermediate processing for further specific user process programming, hereafter the intermediate processing will be referred to as a licensee-owner configuration template (UPLM CT), and then into final processing components, wherein the tasks being implemented by the one to a plurality of UPLMs, the tasks including:

implementing operating system type components, the components including:
   a data entry point member,
   an entry location of data,
   an association of components,
   a destination directory,
   a data server application procedures,
   implementing installed application services, the application services including:
   a central application component,
   a central data management application component,
   a interface application service,
   a interface device service,
   user selected references for selected applications including required support components needed for said selections,
   a retrieval application,
   a requirement for proper application processing,
   background information in areas of expertise of said UPLMs,
   background information in areas of expertise of remotely access application,
   a licensee-owner database structure,
   a database access application,
   a remote access information application,
   a user specific remote access application,
   implementing data store type components, the data store type components including:
   data storage in a relational database,
   data storage in a non-relational database,
   data storage in an ASCII text file having delimited or fixed length fields,
   data downloaded into a text file from a network,
   data storage from a network by internet, main frame, local, or single computer data search, and retrieval,
   implementing text file components, the text file components including:
   a data file conversion component from an unsupported data management application or operating system,
   an ad hoc data file generation component with a text editor,
   a text file input or output operation component including a log file component,
   a data reading component for reading data from said selected data files, updating fields, adding new records,
   a data writing component for writing data back to text file for output generation,
   implementing database components, the database components including:
   a manage data binding component,
   adding and saving data to an underlying database, as a new record from a said UPLM specific data sets,
   an enabling data entry for record update,
   a rolling back at least one of said UPLM specific data sets or associated database on occurrence of associated process or system error events or decision to cancel process,
   a licensee-owner account database storage space selection,
   a database for items selected in separate application,
   one to a multiple specific information retrieval about data type retrieved from a database connection,
   implementing plug-in components, the plug-in components including:
   ActiveX controls,
   Java applets,
   any plug in technology, and
   wherein the user specific data input options and the units of central data management components are selected and implemented as discreet units creating said UPLM CTs, wherein the UPLM CTs are generated by a localization tool, the generation of the UPM CTs includes:
binding data in a grouping hierarchy data set to a set of controls on a form,
binding data in a relation hierarchy data set to a set of controls on a form,
configuring a collection of file templates that export reports in at least one of a plurality of data formats, and
passing data from an application or object to another application or object,
wherein the UPLM CT is at least on of a plurality of layouts containing objects,
wherein the localization tool:
tracks any additions, changes, or deletions of UPLMs,
accesses selection of directories of native language voice filed which are used for UPLM implementation,
stores alert and error messages containing replacement parameters of text and character sets; and
connecting said remote access device interface component to said associating said user specific work-product data with one to a plurality of UPLMs, wherein each UPLM:
is not limited to a visual display, and
selection requests are limited to the user and are based on the licensee-user data structure by predetermined UPLM configured options, where all selections are generated by input selections that are specific only to each user.

2. The central digital data storage and processing components UPLM of claim 1, wherein a centralized computer system contains one to a plurality of central system components, the one to a plurality of central system components including:
a remote user interface application and associated interface device,
central storage devices,
a central data management application,
a central processing unit,
a mapping application to licensee-owner data locations,
any other application, file, and computer component required by user for access to said licensee-owner central computer system UPLM configuration.

3. The remote user access of claim 1 further including:
a telephone device type connection including conventional land, interact, wireless and satellite telephone,
a computer telephone detection and interface card including a means for data entry and retrieval,
a computer wireless telephone detection and interface card including a means for data entry and retrieval,
a direct computer modem connection,
an internet connection including Email, HTML pages, WAP pages, messenger applications, and chat rooms,
an Internet type network interfacing with said plurality of data management application components as a single or a group of Web type pages working together in a browser,
a facsimile including, an automatic OCR application,
a cable or satellite connection including consisting of a converter and a receiver,
a global positioning system (GPS) device connection,
a remote personal computer including a handheld device,
an embedded program device,
a internet to remote platform display including visual telephone display,
a graphics oriented video program transmitting means, and
a broadcast communications device coupled to a data interface unit.

4. The user specific data input options of claim 1, further including request options associated with the one to a plurality of UPLMs connected and bound to a data source including, a plurality of hierarchical request options, the plurality of hierarchical request options including:
input variables,
application parameters,
licensee-owner data input locations,
application component interface,
user identification codes,
user passwords,
customer job code,
user data output means,
user input transmitter unit,
user output receiver type,
any user specified identifier coupled with user specified data input associated with user requested licensee-owner account information,
any user specified identifier coupled with user specified information output associated with user requested licensee-owner account information,
any predetermined identifiers associated with licensee-owner specific centralized applications,
any predetermined identifiers associated with licensee-owner specific data locations,
reference points for application execution results whereby said application results may be applied in other applications or device interface, including:
output variables or other output members,
programming parameters,
data source,
file mapping,
file pointers,
menu driven selection descriptors,
database object names,
separate database, database tables, database queries or combination thereof, including database data entry points including: field search specifiable from a selection list of field search parameters within licensee-owner account database with navigation, search and find capabilities,
applications used to manage information derived from said licensee-owner database tables and queries creating either single query data sets or data sets managing more complex one to many data relationships, hereto referred to as UPLM specific data sets,
pointers for input of user data, including but not exclusive to: receiving, recording, storing, indexing, transacting, and retrieving functions,
pointers for output of licensee-owner data,
components designed to input data from said UPLM specific data sets including any changes or additions to said UPLM specific data sets within including:
associated said licensee-owner database,
associated delimited text file, or output document, and
minimal network browser checkbox or radial button type page for including:
data entry
data query data of licensee-owner database,
adding a table, column, field, text field,
any other information associated with said data source access, whereby said user request options include: constructing, selecting, configuring, arranging, managing, and utilizing said UPLM design interface to said licensee-owner central information account.

5. The discreet units of central data management procedures implementation of UPLM in claim 1, further including implementation utilizing third-party proprietary software data storage and management applications, the third-party proprietary software data storage and management applications including:
  accounting and financial management related applications,
  quantitative method analysis for business decisions related applications,
  tracking, scheduling, and document storage related applications,
  information services related applications,
  remote data device information storage, such as device GPS information,
  remote data device communications systems,
  Exchange Server only in managing data as user's input into their UPLM data source, wherein said data management application procedures:
    access centralized N tier level server applications; and
    update said licensee-owner specific data.

6. A remote user collaborative data system interface for accessing a licensee-owner work-product data management central computer system, the interface comprising:
  providing, by a central processor, the central processor coupled to one to a plurality of remote user information device interface receivers and transmitters, remote access to licensee-owner selected, work-product data and work-product information, wherein the licensee-owner selected, work-product data and work-product information is associated with one to a plurality of user process ledgers modules (UPLM), wherein tasks are implemented by the one to a plurality of UPLMs, the implemented tasks including:
    implementing operating system type components, the operating system type components including:
      a data entry point member,
      an entry location of data,
      an association of components,
      a destination directory,
      a data server application procedures,
    implementing installed application services, the installed application services including:
      a central application component,
      a central data management application component,
      a interface application service,
      a interface device service,
      user selected references for selected applications including required support components needed for said selections,
      a retrieval application,
      a requirement for proper application processing,
      background information in areas of expertise of said UPLMs,
      background information in areas of expertise of remotely access application,
      a licensee-owner database structure,
      a database access application,
      a remote access information application,
      a user specific remote access application,
    implementing data store type components, the data store type components including:
      data storage in a relational database,
      data storage in a non-relational database,
      data storage in an ASCII text file having delimited or fixed length fields,
      iv. data downloaded into a text file from a network,
      v. data storage from a network by internet, main frame, local, or single computer data search, and retrieval,
    implementing text file components, the text file components including:
      a data file conversion component from an unsupported data management application or operating system,
      an ad hoc data file generation component with a text editor,
      a text file input/output operation component including a log file component,
      a data reading component for reading data from said selected data files, updating fields, adding new records,
      a data writing component for writing data back to text file for output generation,
    implementing database components, the database components including:
      a manage data binding component,
      adding and saving data to an underlying database, as a new record from a said UPLM specific data sets,
      an enabling data entry for record update,
      a rolling back at least one of said UPLM specific data sets or associated database on occurrence of associated process or system error events or decision to cancel process,
      a licensee-owner account database storage space selection,
      a database for items selected in separate application,
      one to a multiple specific information retrieval about data type retrieved from a database connection,
    implementing plug-in components, the plug-in components including:
      ActiveX controls,
      Java applets,
      any plug in technology, and
  a licensee-owner account interface, by a central processor, the central processor coupled to one to a plurality of remote user information device interface receivers and transmitters, which accesses the licensee-owner selected, work-product data management components and employs the remote user central interface connecting a remote user device to central licensee-owner data and data management applications, and is implemented by user option selection references, wherein the remote user central interface includes user process ledger modules (UPLMs),
  wherein the remote user central interface is limited to a specific hierarchy of input requests that are associated only to the specific needs of the individual client for data input, and
  wherein licensee-owner specified generation of the UPLMs encapsulates abilities, the abilities including;
    selecting licensee-owner defined database functionality based on data in underlying licensee-owner central system database, the databases including:
      implementing and generating queries,
      adding or modifying data connections, and
      generating fields and select field data types,
    selecting licensee-owner defined database tools, the tools including:
      building SQL statements that retrieve data or modify table data fields contents,
      generate grids or displays of database objects, representing data, data fields, tables and said data relationship % generate and modify database objects and append records to a table in a database, enter data in a network browser type page text field element and implementing licensee-owner defined code to append data to corresponding fields in licensee-owner database, and generate a data set as an underlying a data object to provide an intermediate, middle tier between licensee-owner database table and a network browser type page to change and update data displayed therein, selecting name objects, including use of a Universal Naming Code (UNC), for accessibility tea Web server, removing and adding a database project when disconnected from said licensee-owner database for off line systems selecting objects that establish said user option selection references, selecting objects that establish connections to said user remote interface devices, adding a selection element to said UPLM specifying items to be presented in said selection element, adding code to said UPLM load event procedure, adding a procedure to present a processing parameter, adding a procedure to present input or output said user option selection references, generating a dynamic link library for said UPLM, generating a network browser type page for said UPLM, generating a selection element of database objects on an Hypertext Markup Language (HTML) template page, including a selection list, binding said HTML template page dements to said database, generating a dialog box element specifying said data object name, said database connection, and data source, selecting a network browser type page application components as objects, the objects including:
  Graphic User Interface (GUI) configuration forms,
  UPLM templates,
  Hypertext Markup Language (HTML)
  document objects formatted for Web documents, and
  document objects providing hypertext linking between documents, including; drawings, pictures, sound, and multimedia content,
  documents referring to other documents by resource location including:
    Internet's Uniform Resource Locator (URL), and
    links pointing to other sections in different documents, on the same document, or different servers at different locations on different platforms, selecting a remote device, associated device central system interface, and associated UPLM user interface presentation format for said user option selection references specific to each user, and selecting central system applications providing required data access drivers for said central system applications interfacing with licensee-owner configured UPLM wherein the generation of said UPLMs can be achieved by either or both central system programmer or by licensee-owner designation of user option selection references within a UPLM component selection template resulting in the user not having to relearn the business or application model during each use or for access; and wherein the licensee-owner specified generation of said UPLMs includes licensee-owner designated work-product interactive interface components, the components including:
  a licensee-owner designated data selection list,
  a licensee-owner designated information collection means,
  a licensee-owner designated document generation means,
  a licensee-owner designated fill in work-product data gathering page placing said data or information into including; tables, display grid, data cells,
  a page providing a search engine interface letting said users search limited licensee-owner designated data,
  a page with licensee-owner designated references to licensee-owner data source objects supplying data, the data being supplied to other objects including:
    a delimited text tile,
    a Web page,
    a temporary data store object,
    a text document,
    a data consuming application,
    a user remote interface display,
    a user remote device,
    a user remote device for caching data sectors to be read offline,
    a server object written to dump user data, and
    a Data URL property to specifying a data set,
  a custom licensee-owner designated data provider object generated from licensee-owner central application objects,
  said licensee-owner designated data provider object as a reusable transaction object with roll-back abilities,
  an independent software vendors licensee-owner designated user interface,
  a service object that obtains user data from licensee-owner designated data source object using existing database management system providing including:
    licensee-owner designated SQL statements, and
    update, insert, and delete capabilities for licensee-owner designated access to said licensee-owner data source work-product object,
  a H323 or similar standard based voice and video conferencing collaborations tool,
  a multipoint licensee-owner designated data conference using T119 data conferencing or similar standards including:
    clipboard operations
    file transfer,
    whiteboard review,
    ability to update information and data,
    chat using text messages, and
    TAPI computer telephony integration,
  a speech service by internet connection or any voice-over-IP type application employing a telephone device using speech to listen to including;
    licensee-owner designated database items
    licensee-owner designated text to speech converted data, and
    licensee-owner designated prerecorded audio files,
  licensee-owner designated data field HTML elements,
  licensee-owner designated programming variable objects referencing procedures including;
    user input variables,
    licensee-owner designated remote access application,
    user remote interface device applications,
    output generation applications, and programming variable objects referencing database objects and components, and said user option selection references processing including;
- receiving and transmitting means,
- an intermediate file system for extracting said selected ledger output
- a message transmission
- a means for responsive to receipt of said UPLM user option selection,
- menu driven selection descriptors,
- user identifiers,
- unique mapping identifiers,
- user data input mapping,
- licensee-owner designated data output format Ides, documents or databases,
- voice files of international dialects output type requested format files,
- scanned images,
- licensee-owner designated workflow automation systems,
- licensee-owner designated output alerts,
- licensee-owner designated electronic document central management system EDCMS, user data applications, including interactive voice dictation applications, for frequently referenced database locations
- user data applications, including interactive voice dictation applications, for frequently referenced database locations,
- procedures that after call roll back to original database state if communication is disconnected,
- accounting and financial management related application components,
- quantitative method analysis for business decisions related application components, tracking, scheduling, and document storage related applications,
- tracking, scheduling, and document storage related applications, information services related application components,
- remote data device information storage application components, and
- remote data device communications systems application components, whereby interactive UPLMs can offer use~a limited selection of specific licensee-owner designated central system work-product application functions designated for that specific remote user.

7. The remote user collaborative data system interface of claim 6, further including providing secure user access, the secure user access including: identification codes, passwords, customer job codes, and identifiers which verify user access credentials and access rights.

8. The remote user collaborative data system interface of claim 6 further including remote user central interface application components employed within said remote user UPLMs, the application components including,
- Remote Access Service (RAS) server network and associated components,
- Virtual Private Network (VPN) access components,
- company intranet connection components,
- public internet access connection components,
- a graphics oriented video program transmitting components,
- a broadcast communications device coupled to a data interface unit,
- direct telephone dial in connection components to including;
- a central computer or computer system,
- Internet web servers,
- private internal network servers,
- a facsimile,
- voice over LF services, whereby viewing or transferring from one computer or device to another, data, documents and associated document summary information, and more advanced information access and data manipulation applications is implemented within UPLM interface employing specific user option selection references.

9. The remote user collaborative data system interface components of claim 6, wherein the interface accesses the central processor at specific data segments and locations within said work-product data management sources by implementing said UPLM data input processing instructions presented as user option selection references, said UPLM use interface further including;
- a standard set of interfaces that provide heterogeneous access to disparate sources of information located in a predetermined licensee-owner account, the location being accessed including, file sources, system directories, system folders, email folders, network servers, web servers, and databases,
- a hierarchy of objects implemented by system applications whereby parent object contains information only about its direct descendents,
- associated hyperlinks followed to input said user generated data segments,
- database system and database applications coupled to said central processing system,
- database system and database applications coupled to customized licensee-owner configuration templates implementation resulting in said user process ledger modules, UPLM, generation,
- database stored procedure to generate database objects and elements for use in said UPLMs,
- processing system of one to a plurality of networked computers containing one to a plurality of database type data storing systems,
- select licensee-owner central system data management application components designed and implemented as discreet units to accomplish a specific licensee-owner specific work-product task or tasks,
- application components for Web and Internet access, the application components including;
  - Hypertext Markup Language, TML, or any other document format for Web documents or pages providing codes used to format hypertext linking pointing to:
    - sections in the same or different documents on the same or different servers, and
    - documents containing references to drawings, pictures, sound, or other multimedia content by location of a particular resource, such as Universal Resource Locator (URL),
  - interactive site user input data analysis components with said user input data collected, processed, and a response generated dyrmrnieally,
- an intranet with application of Internet technologies in internal corporate networks for sharing information using network browser on said remote user computer and a network server and, connected to the internet implementing Web navigation and search engines, a corporate intranet, information being transferred between different internal departments stored in an network server for ensuring availability of the latest file versions, a central computer running an FTP or Hypertext Transfer Protocol (HTTP) server with access to said licensee-owner account, and wherein said licensee-owner can control said central processor to access to specific data segments and locations within the work-product data management sources by implementing UPLM processor access instructions presented as user data output and output generation applications, the UPLM processor access instructions not necessarily requiring said remote user selected data input, or database input applications, or said remote user selected output, or output generation applications.

10. A system of one to a plurality of detection and communication devices coupled to a central processing system for collaborative accessing and transferring of digital data segments, the one to a plurality of detection and communication devices including remote user devices, wherein each remote user device comprises:

an associated central processing system device interface, the interface capable of at least one of receiving and transmitting for transmitting and receiving remote user communications, and an interface providing, by a central processor, the central processor coupled to one to a plurality of remote user information device interface receivers and transmitters, remote access to licensee-owner selected, work-product data and work-product information, wherein the licensee-owner selected, work-product data and work-product information is associated with one to a plurality of user process ledgers modules (UPLM), wherein tasks are implemented by the one to a plurality of UPLMs, the implemented tasks including, implementing operating system type components, the components including:
a data entry point member,
an entry location of data,
an association of components,
a destination directory,
a data server application procedures, implementing installed application services, the application services including:
a central application component,
a central data management application component,
a interface application service,
a interface device service,
user selected references for selected applications including required support components needed for said selections,
a retrieval application,
a requirement for proper application processing,
background information in areas of expertise of said UPLMs,
background information in areas of expertise of remotely access application,
a licensee-owner database structure,
a database access application,
a remote access information application,
a user specific remote access application, implementing data store type components, the data store type components including:
data storage in a relational database,
data storage in a non-relational database,
data storage in an ASCII text file having delimited or fixed length fields,
data downloaded into a text file from a network,
data storage from a network by internet, main frame, local, or single computer data search, and retrieval, implementing text file components, the text file components including:
a data file conversion component from an unsupported data management application or operating system,
an ad hoc data file generation component with a text editor,
a text file input or output operation component including a log file component,
a data reading component for reading data from said selected data files, updating fields, adding new records,
a data writing component for writing data back to text file for output generation, implementing database components, the database components including:
a manage data binding component,
adding and saving data to an underlying database, as a new record from a said UPLM specific data sets,
an enabling data entry for record update,
a rolling back at least one of said UPLM specific data sets or associated database on occurrence of associated process or system error events or decision to cancel process,
a licensee-owner account database storage space selection,
a database for items selected in separate application,
one to a multiple specific information retrieval about data type retrieved from a database connection, implementing plug-in components, the plug-in components including:
ActiveX controls,
Java applets,
any plug in technology, and wherein the interface is limited to a specific hierarchy of input requests that are associated only to the specific needs of the individual client for data input, and wherein licensee-owner specified generation of the UPLMs encapsulates abilities, the abilities including;
selecting licensee-owner defined database functionality based on data in underlying licensee-owner central system database, the databases including:
implementing and generating queries,
adding or modifying data connections, and
generating fields and select field data types, selecting licensee-owner defined database tools, the tools including:
building SQL statements that retrieve data or modify table data fields contents,
generate grids or displays of database objects, representing data, data fields, tables and said data relationship %
generate and modify database objects and append records to a table in a database,
enter data in a network browser type page text field element and implementing licensee-owner defined code to append data to corresponding fields in licensee-owner database, and generate a data set as an underlying a data object to provide an intermediate, middle tier between licensee-owner database table and a network browser type page to change and update data displayed therein, selecting name objects, including use of a Universal Naming Code (UNC), for accessibility tea Web server, removing and adding a database project when disconnected from said licensee-owner database for off line systems selecting objects that establish said user option selection references, selecting objects that establish connections to said user remote interface devices, adding a selection element to said UPLM specifying items to be presented in said selection element, adding code to said UPLM load event procedure, adding a procedure to present a processing parameter, adding a procedure to present input or output said user option selection references, generating a dynamic link library for said UPLM, generating a network browser type page for said UPLM, generating a selection element of database objects on an Hypertext Markup Language (HTML) template page, including a selection list, binding said HTML template page dements to said database, generating a dialog box element specifying said data object name, said database connection, and data source, selecting a network browser type page application components as objects, the objects including:
  Graphic User Interface (GUI) configuration forms,
  UPLM templates,
  Hypertext Markup Language (HTML)
  document objects formatted for Web documents, and
  document objects providing hypertext linking between documents, including; drawings, pictures, sound, and multimedia content,
  documents referring to other documents by resource location including:
    Internet's Uniform Resource Locator (URL), and links pointing to other sections in different documents, on the same document, or different servers at different locations on different platforms,
  selecting a remote device, associated device central system interface, and associated UPLM user interface presentation format for said user option selection references specific to each user, and selecting central system applications providing required data access drivers for said central system applications interfacing with licensee-owner configured UPLM, and a central processing system, wherein the central processing system comprises:
  licensee-owner work-product designated central application components presenting remote user option selections and responding to remote user options selection requests for at least one of:
    data input, or
    verification information output associated with licensee-owner central data source account structure,
  centralized data management system of the licensee-owner work-product information in said licensee-owner central account, accessible by user process ledgers module (UPLM) processing instructions,
  central non-transitory computer storage mediums for digitally storing user process ledgers modules (UPLM), remote user accessed licensee-owner work-product information, central data management applications, and the licensee-owner work-product designated central application,
  wherein the UPLM specifications are selected from UPLM configuration templates (UPLM CT),
  wherein the UPLM CTs are generated by a localization tool, the generation of the UPM CTs includes:
    binding data in a grouping hierarchy data set to a set of controls on a form,
    binding data in a relation hierarchy data set to a set of controls on a form,
    configuring a collection of file templates that export reports in at least one of a plurality of data formats, and
    passing data from an application or object to another application or object,
  wherein the UPLM CT is at least on of a plurality of layouts containing objects,
  wherein the localization tool:
    tracks any additions, changes, or deletions of UPLMs,
    accesses selection of directories of native language voice filed which are used for UPLM implementation,
    stores alert and error messages containing replacement parameters of text and character sets.

11. The associated central processing system device interfaces of claim 10, further comprising, in response to said remote user data input option selections, interconnects with applications specified for said remote user device and associated central processing system device interface systems, the interconnection occurring over including:
  a telephone or telephone device connection including: conventional land interact, wireless and satellite telephone, with components able to send data segments,
  a remote computer network device connection including:
    VPN Internet connection,
    user specific Area Network (LAN),
  a direct computer modem device cormeefion,
  a facsimile including but not nooeseorily an automatic OCR application,
  a facsimile transceiver,
  a facsimile FAX machine,
  a fax interface board,
  FAXIMODEM cards,
  FAX/IvIODEM cards with Faxmodem chips augmented to handle speech,
  a cable or satellite device connection,
  a global positioning device system (GPS),
  a computer telephone detection and interface device card including a means for data entry and retrieval,
  a computer wireless telephone detection and interface device including SIMS cards and data entry and specific data packet retrieval for confirmation and verification,
  a remote personal computer or a handheld device,
  a visual embedded program device,
  a internet to remote platform device including visual display,
  a graphics oriented video licensee-owner central data system transmitting device including,
    visual data input into said licensee-owner central data system, visual data output from said licensee-owner central data system, said remote user option selections presented as visual options selections, and video broadcast of video oriented remote user specific data and information, m) a broadcast communications device coupled to a data interface unit wherein said remote device communicates information employing UPLM processing instructions, and wherein the UPLM can input a single data type into any licensee-user central data system from any single remote device or by accessing data from other remote devices including other licensee-user central data system locations.

12. The associated central processing system device interfaces of claim 11, further including selection of devices and systems to interface with, the selectable devices and systems to interface with including:
a central computer,
a network of servers,
a local area network (LAN),
a secure wide area network (WAN~,
a VPN Internet connection, and
a telephony interface,
whereby wherein the selectable devices and systems provide remote users with work-product access capabilities specific to the user UPLM specification, including:
access to server network data and information,
access to shared private users information established by user UPLM configuration
access to said licensee-owner specific work-product data and information,
access to said licensee-owner work-product designated central application components.

13. The remote user collaborative data system interface of claim 10, further including providing secure user access, the secure user access including: identification codes, passwords, customer job codes, and identifiers which verify user access credentials and access rights.

14. The remote user collaborative data system interface of claim 10 further including remote user central interface application components employed within said remote user UPLMs, the application components including,
Remote Access Service (RAS) server network and associated components,
Virtual Private Network (VPN) access components,
company intranet connection components,
public internet access connection components,
a graphics oriented video program transmitting components,
a broadcast communications device coupled to a data interface unit,
direct telephone dial in connection components to including;
a central computer or computer system,
Internet web servers,
private internal network servers,
a facsimile,
voice over LF services, whereby viewing or transferring from one computer or device to another, data, documents and associated document summary information, and more advanced information access and data manipulation applications is implemented within UPLM interface employing specific user option selection references.

15. The central processing system of claim 10 wherein designation of data management component functions may be accomplished by UPLM CT eliminating the need for large website and webpage design and user website knowledge, comprising selection means for one to a plurality of interrelated central data management functions including:
applications components that implement user vehfication and access security management granting access permission to file, table, or field location by secure remote user recognition system including central system remote user account set up, central system remote user and licensee-owner account maintenance of passwords, password encryption, change password functions, and said licensee-owner data system access permission codes,
applications that implement data source location search for one or both data retrieval and data input including:
applications for access of said licensee-owner data system by multi level hierarchical profiles as said remote user option selections associated with licensee-owner specific tables or field locations for retrieval and input of licensee-owner file locations or data concerning subject of said table or field location,
applications for licensee-owner data system access by licensee-owner configured said remote user option selections to specific tables or field type locations,
applications for licensee-owner data system access by licensee-owner configured said remote user option selections to specific tables or field type locations for retrieval and input of voice file name and directory locations and voice file playback execution,
applications for securing said licensee-owner data system access permissions,
applications for requesting remote user specific parameters for search and application user parameter input values,
application for said licensee-owner data system configuration by said multi level hierarchical profiles categories selection for generation of user and licensee-owner specific tables or field locations within said licensee-owner data system,
applications responding to requests for data set, t-de, table, field, dam input location, input value, parameter value, or for a remote access application selection,
applications responding to voice file requests directed to user for input of said remote user specific data or information into said licensee-owner data system selection,
applications executing hierarchy of said remote user options selections that access one or more said licensee-owner data systems and information access applications,
applications executing user file placement into user account directories on said central storage system,
applications that implement telephony control interface including:
licensee-owner data recognition data from component systems such as caller ID,
input of global positioning system (GPS) information data,
input of recorded messages and message file locations into said licensee-owner data system,
playback recorded messages from message file locations by said licensee-owner designated data system query,
applications that implement synthesized text to speech of licensee-owner designated licensee-owner data further including: text message, stored email recognition including either or both name and content conversion, applications for access of said licensee-owner data system by multi level hierarchical profiles selection associated with licensee-owner specific tables or field locations for retrieval and input of voice file locations or data concerning subject of table or field location, and associated data management applications, applications for retrieval and input of alphanumeric data through DTMF tones recognition and conversion, applications accepting a destination phone number for a separate fax callback, and applications initiating switch to fax mode for same call transmission, and applications that implement information processing with input of said remote licensee-owner specific work-product data or information including:
financial accounting applications,
business applications,
engineering applications,
interact and information search applications,
PERT analysis applications,
CAD design applications,
medical and pharmaceutical search applications,
contact information, tracking and scheduling,
user research information access,
legal document storage and discovery presentation, and
above applications combined with world language interpretation of said licensee-owner data or information, whereby designated UPLMs remote user presentation and limited access to central licensee-owner data system provides central system manager or licensee-owner to manage and organize user work-product operation and information by employing selection guides within said licensee-owner configuration templates for said user work-product data to be properly configured and managed in UPLM generation and in implementation avoiding said remote user decision making requiring more comprehensive knowledge of said work-product area of expertise.

16. The UPLMs of claim 11, wherein the remote user data options selections further comprise user identifiers for gathering specific, previously referenced, user parameters from within said licensee-owner data system, which are then applied within said UPLM processing according to said incoming requests, data type, communications devise type, and to required said licensee-owner central application processing input parameters wherein the parameters are device or application based and are gathered with or without the input or knowledge of the user for either or both data verification and data augmentation.

* * * * *